United States Patent
Tang

(10) Patent No.: US 11,330,666 B2
(45) Date of Patent: May 10, 2022

(54) DATA TRANSMITTING METHOD AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/850,844

(22) Filed: Apr. 16, 2020

(65) Prior Publication Data

US 2020/0245405 A1     Jul. 30, 2020

Related U.S. Application Data

(63) Continuation of application No. PCT/CN2018/091888, filed on Jun. 19, 2018.

(30) Foreign Application Priority Data

Oct. 20, 2017  (WO) ................ PCT/CN2017/107168
Nov. 17, 2017  (WO) ................ PCT/CN2017/111688

(51) Int. Cl.
*H04W 80/00*  (2009.01)
*H04W 80/10*  (2009.01)
(Continued)

(52) U.S. Cl.
CPC ........... *H04W 80/10* (2013.01); *H04M 15/66* (2013.01); *H04W 40/02* (2013.01);
(Continued)

(58) Field of Classification Search
CPC ..... H04W 80/10; H04W 76/12; H04W 40/02; H04W 40/248; H04W 48/18; H04M 15/66
See application file for complete search history.

(56) References Cited

U.S. PATENT DOCUMENTS 9,860,872 B2    1/2018  Himayat et al.
2015/0038150 A1  2/2015  Wang et al.
(Continued)

FOREIGN PATENT DOCUMENTS

CN    101030157 A    9/2007
CN    101651909 A    2/2010
(Continued)

OTHER PUBLICATIONS

Ericsson. "PDU Session vs PDU Session Resource" 3GPP TSG-RAN WG3 Meeting #97 R3-173219, Aug. 25, 2017 (Aug. 25, 2017), section 2, 8.2.1 and 17.3.4.4.
(Continued)

*Primary Examiner* — Khai M Nguyen
(74) *Attorney, Agent, or Firm* — Perkins Coie LLP

(57) ABSTRACT

Disclosed are a data transmission method and a terminal device. The method comprises: storing, by the terminal, a parameter value list; sending, by a terminal device, an first protocol data unit (PDU) session establishment request message to a session management function (SMF), wherein the first PDU session request includes at least one value in at least one of the parameter value list; and receiving, by the terminal device, a response message sent by the SMF, wherein the response message carries a rejection cause value to indicate the cause why the first PDU session is established unsuccessfully.

18 Claims, 5 Drawing Sheets

(51) Int. Cl.
*H04M 15/00* (2006.01)
*H04W 40/24* (2009.01)
*H04W 48/18* (2009.01)
*H04W 76/12* (2018.01)
*H04W 40/02* (2009.01)

(52) U.S. Cl.
CPC ......... *H04W 40/248* (2013.01); *H04W 48/18* (2013.01); *H04W 76/12* (2018.02)

(56) References Cited

U.S. PATENT DOCUMENTS

| | | | |
|---|---|---|---|
| 2015/0351079 | A1 | 12/2015 | Himayat et al. |
| 2015/0373699 | A1 | 12/2015 | Xu et al. |
| 2017/0180259 | A1 | 6/2017 | Yu et al. |
| 2017/0303259 | A1 | 10/2017 | Lee et al. |
| 2018/0324577 | A1 | 11/2018 | Faccin et al. |
| 2019/0124181 | A1 | 4/2019 | Park et al. |
| 2020/0120738 | A1* | 4/2020 | Kawasaki ............. H04W 76/18 |
| 2020/0178196 | A1 | 6/2020 | Wang et al. |
| 2020/0245405 | A1 | 7/2020 | Tang |
| 2020/0252900 | A1* | 8/2020 | Kim ...................... H04W 76/12 |
| 2020/0296777 | A1* | 9/2020 | Tang .................... H04W 80/10 |

FOREIGN PATENT DOCUMENTS

| | | | |
|---|---|---|---|
| CN | 103428708 | A | 12/2013 |
| CN | 103444148 | A | 12/2013 |
| CN | 103546304 | A | 1/2014 |
| CN | 106155818 | A | 11/2016 |
| CN | 106465178 | A | 2/2017 |
| CN | 106851856 | A | 6/2017 |
| CN | 106900081 | A | 6/2017 |
| CN | 107018194 | A | 8/2017 |
| CN | 107018542 | A | 8/2017 |
| EP | 3637944 | A4 * | 8/2020 ............ H04W 88/14 |
| RU | 2574345 | C2 | 2/2016 |
| WO | 2017142362 | A1 | 8/2017 |

OTHER PUBLICATIONS

Oppo. "Updating for Clause 6.1.2.2 in TS 23503" 3GPP SA WG2 Meeting #123 S2-176999, Oct. 17, 2017 (Oct. 17, 2017), section 6.1.2.2.
Ericsson. "TS 23.501: Clean up of PCF and Reference Point Names for PCC" 3GPP SA WG2 Meeting #121 S2-173014, May 19, 2017 (May 19, 2017), section A.3.1.8 and A.4.1.
International Search Report in the international application No. PCT/CN2018/091888, dated Jul. 30, 2018.
International Search Report in the international application No. PCT/CN2017/107168, dated Jul. 13, 2018.
International Search Report in the international application No. PCT/CN2017/111688, dated Jul. 10, 2018.
3rd Generation Partnership Project;Technical Specification Group Services and System Aspects;Procedures for the 5G System;Stage 2 (Release 15); 3GPP TS 23.502 V1.2.0 (Sep. 2017).
First Office Action of the Russian application No. 2020116371, dated Feb. 12, 2021.
First Office Action of the U.S. Appl. No. 16/755,879, dated Apr. 22, 2021.
First Office Action of the Canadian application No. 3079480, dated May 31, 2021. 4 pages.
Office Action of the Indian application No. 202017020778, dated Jun. 3, 2021. 5 pages with English translation.
First Office Action of the Chinese application No. 202010303770.9, dated Jun. 8, 2021. 12 pages with English translation.
TS23.501 v1.2.0, System Architecture for the 5G System, the Stage 2 (Release 15), 3GPP server publication date (Jul. 26, 2017) 166 pages.
First Office Action of the Korean application No. 10-2020-7014334, dated Jul. 29, 2021. 9 pages with English translation.
Oppo, "UE Route Selection Policy", SA WG2 Meeting #124 S2-178438, [online], Nov. 21, 2017, the Internet<URL: https://www.3gpp.org/ftp/tsg_sa/WG2_Arch/TSGS2_124_Reno/Docs/S2-178438.zip>. 9 pages.
First Office Action of the Japanese application No. 2020-521884, dated Aug. 17, 2021. 10 pages with English translation.
First Office Action of the European application No. 18868123.3, dated Aug. 9, 2021. 8 pages.
3rd Generation Partnership Project;Technical Specification Group Services and System Aspects;Policy and Charging Control Framework for the 5G System;Stage 2(Release 15), 3GPP TS 23.503 V0.2.0 (Sep. 2017).
Nokia et al: "NAS transport: alternative 2 cleanup", 3GPP Draft; C1-174048, 3rd Generation Partnership Project (3GPP), Mobile Competence Centre; 650, Route Des Lucioles; F-06921 Sophia-Antipolis Cedex; France, vol. CT WG1, No. Kochi (India); Oct. 23, 2017-Oct. 27, 2017 Oct. 16, 2017 (Oct. 16, 2017), XP051349833, Retrieved from the Internet: URL: http://www.3gpp.org/ftp/tsg_ct/WG1_mm-cc-sm_ex-CN1/TSGC1_106_Kochi/docs/ [ retrfeved on Oct. 16, 2017] * Sections 9.4.2.2, 9.4.2.3, 9.4.3.2-9.4.7.3*.
Supplementary European Search Report in the European application No. 18868123.3, dated Oct. 14, 2020.
First Office Action of the Chinese application No. 202010099121.1, dated Nov. 3, 2020.
3rd Generation Partnership Project; Technical Specification Group Services and System Aspects; Policy and Charging Control Framework for the 5G System; Stage 2 (Release 15); 3GPP TS 23.503 V0.3.0 (Sep. 2017).
Supplementary European Search Report in the European application No. 17928855.0, dated Sep. 11, 2020.
Written Opinion of the International Search Authority in the international application No. PCT/CN2018/091888, dated Jul. 30, 2018.
Written Opinion of the International Search Authority in the international application No. PCT/CN2017/107168, dated Jul. 13, 2018.
Written Opinion of the International Search Authority in the international application No. PCT/CN2017/111688, dated Jul. 10, 2018.
Office Action of the Indian application No. 202017020780, dated Sep. 15, 2021. 6 pages with English translation.
Second Office Action of the Chinese application No. 202010303770.9, dated Sep. 30, 2021. 11 pages with English translation.
Notice of Allowance of the U.S. Appl. No. 16/755,879, dated Oct. 27, 2021. 20 pages.
First Office Action of the Taiwanese application No. 107136608, dated Nov. 15, 2021. 22 pages with English translation.

* cited by examiner

DATA TRANSMITTING METHOD AND TERMINAL DEVICE

CROSS-REFERENCE TO RELATED APPLICATIONS

This is a continuation application of International Patent Application No. PCT/CN2018/091888, filed on Jun. 19, 2018, which claims priority to PCT Patent Application No. PCT/CN2017/107168, filed with the Chinese Patent Office on Oct. 20, 2017 and entitled "DATA TRANSMISSION METHOD, TERMINAL DEVICE, AND NETWORK DEVICE", and PCT Patent Application No. PCT/CN2017/111688, filed with the Chinese Patent Office on Nov. 17, 2017 and entitled "DATA TRANSMISSION METHOD, TERMINAL DEVICE, AND NETWORK DEVICE", which are incorporated herein by reference in their entireties.

BACKGROUND

In a wireless communications network, before performing a related service, a terminal device needs to complete an establishment process of a protocol data unit (PDU) session. A session management function (SMF) device needs to establish the PDU session according to an establishment parameter sent by the terminal device. Once establishment of the PDU session fails, the SMF device notifies the terminal device to re-initiate establishment of the PDU session. A solution in the prior art may increase signaling overheads, and reduce a success rate of establishing the PDU session.

SUMMARY

In view of this, embodiments of this disclosure relate to the communications field, and provide a data transmission method, a terminal device, and a session management function SMF device, to facilitate reduction in signaling overheads and increase in a probability of PDU session success.

A first aspect provides a data transmission method, including: sending, by a terminal device, an establishment request message of a first protocol data unit PDU session to a session management function SMF device, where the establishment request message of the first PDU session carries a parameter value list and/or a parameter value combination list of at least one parameter used to establish the first PDU session.

A parameter value list and/or a parameter value combination list of an establishment parameter of a PDU session are sent to the SMF device, so that the SMF device can flexibly select a parameter value, thereby facilitating increase in a probability that the PDU session is established successfully.

In a possible implementation, parameter values of a first parameter in the parameter value list include a plurality of values, and the plurality of values has priorities.

In a possible implementation, a first parameter value combination in the parameter value combination list includes a value of each parameter of the at least one parameter.

In a possible implementation, the parameter value combination list includes a plurality of parameter value combinations, and the plurality of parameter value combinations has priorities.

In a possible implementation, the at least one parameter used to establish the PDU session includes at least one of the following parameters: a radio access technology RAT type, a session and service continuity mode, single-network slice selection assistance information S-NSSAI, and a data network name DNN.

In a possible implementation, the RAT type includes at least one of the following access technologies: new radio NR, long term evolution LTE, global system for mobile communications GSM, code division multiple access CDMA, general packet radio service GPRS, a wireless local area network WLAN, and satellite access.

In a possible implementation, the RAT type includes at least one of the following access technologies: 3rd Generation Partnership Project 3GPP and non-3GPP.

In a possible implementation, the method further includes: receiving, by the terminal device, a response message sent by the SMF device, where the response message carries a value of a cause why the first PDU session is established unsuccessfully.

In a possible implementation, the value of the cause is used to indicate that none of the parameter values of the first parameter in the parameter value list satisfies an establishment requirement.

In a possible implementation, the response message further carries a value, of the first parameter, allowed by the SMF device.

In a possible implementation, the method further includes: sending, by the terminal device in response to the response message, an establishment request message of a second PDU session or a modification request message of an established PDU session to the SMF device.

A second aspect provides a data transmission method, including: sending, by a terminal device, an establishment request message of a first protocol data unit PDU session to a session management function SMF device; and receiving, by the terminal device, a response message sent by the SMF device, where the response message carries a value of a cause why the first PDU session is established unsuccessfully.

A session establishment status is fed back to the terminal device, so that the terminal device can adjust a session establishment policy in time, thereby facilitating improvement in performance of a communications system.

In a possible implementation, the establishment request message of the first PDU session carries a parameter value list and/or a parameter value combination list of at least one parameter used to establish the first PDU session.

In a possible implementation, parameter values of a first parameter in the parameter value list include a plurality of values, and the plurality of values has priorities.

In a possible implementation, the value of the cause is used to indicate that none of the parameter values of the first parameter in the parameter value list satisfies an establishment requirement.

In a possible implementation, the response message further carries a value, of the first parameter, allowed by the SMF device.

In a possible implementation, a first parameter value combination in the parameter value combination list includes a value of each parameter of the at least one parameter.

In a possible implementation, the parameter value combination list includes a plurality of parameter value combinations, and the plurality of parameter value combinations has priorities.

In a possible implementation, the parameter used to establish the first PDU session includes at least one of the following parameters: a radio access technology RAT type, a session and service continuity mode, single-network slice selection assistance information S-NSSAI, and a data network name DNN.

In a possible implementation, the method further includes: sending, by the terminal device in response to the response message, an establishment request message of a new PDU session to the SMF device.

In a possible implementation, the sending, by the terminal device in response to the response message, an establishment request message of a new PDU session to the SMF device includes: sending, by the terminal device in response to the response message, an establishment request message of a new PDU session to the SMF device according to a parameter value list of at least one parameter used to establish the PDU session.

A third aspect provides a data transmission method, including: receiving, by a session management function SMF device, an establishment request message of a first protocol data unit PDU session sent by a terminal device, where the establishment request message of the first PDU session carries a parameter value list and/or a parameter value combination list of at least one parameter used to establish the first PDU session; and establishing, by the SMF device, the first PDU session according to the parameter value list and/or the parameter value combination list.

In a possible implementation, parameter values of a first parameter in the parameter value list include a plurality of values, and the plurality of values has priorities.

In a possible implementation, the method further includes: sending, by the SMF device, a response message to the terminal device, where the response message carries a value of a cause why the first PDU session is established unsuccessfully.

In a possible implementation, the value of the cause is used to indicate that none of the parameter values of the first parameter in the parameter value list satisfies an establishment requirement.

In a possible implementation, the response message further carries a value, of the first parameter, allowed by the SMF device.

In a possible implementation, after the sending, by the SMF device, a response message to the terminal device, the method further includes: receiving, by the SMF device, an establishment request message of a second PDU session or a modification request message of an established PDU session sent by the terminal device.

In a possible implementation, a first parameter value combination in the parameter value combination list includes a value of each parameter of the at least one parameter.

In a possible implementation, the parameter value combination list includes a plurality of parameter value combinations, and the plurality of parameter value combinations has priorities.

In a possible implementation, the method further includes: establishing, by the SMF device, the first PDU session according to a second parameter value combination in the parameter value combination list if the first parameter value combination in the parameter value combination list does not satisfy a requirement.

In a possible implementation, a priority of the first parameter value combination is higher than that of the second parameter value combination.

In a possible implementation, the at least one parameter used to establish the PDU session includes at least one of the following parameters: a radio access technology RAT type, a session and service continuity mode, single-network slice selection assistance information S-NSSAI, and a data network name DNN.

In a possible implementation, the RAT type includes at least one of the following access technologies: new radio NR, long term evolution LTE, global system for mobile communications GSM, code division multiple access CDMA, general packet radio service GPRS, a wireless local area network WLAN, and satellite access.

In a possible implementation, the RAT type includes at least one of the following access technologies: 3rd Generation Partnership Project 3GPP and non-3GPP.

A fourth aspect provides a data transmission method, including: receiving, by a session management function SMF device, an establishment request message of a first protocol data unit PDU session sent by a terminal device; and sending, by the SMF device, a response message to the terminal device, where the response message carries a value of a cause why the first PDU session is established unsuccessfully.

In a possible implementation, the establishment request message of the first PDU session carries a parameter value list and/or a parameter value combination list of at least one parameter used to establish the first PDU session.

In a possible implementation, parameter values of a first parameter in the parameter value list include a plurality of values, and the plurality of values has priorities.

In a possible implementation, the value of the cause is used to indicate that none of the parameter values of the first parameter in the parameter value list satisfies an establishment requirement.

In a possible implementation, the response message further carries a value, of the first parameter, allowed by the SMF device.

In a possible implementation, a first parameter value combination in the parameter value combination list includes a value of each parameter of the at least one parameter.

In a possible implementation, the parameter value combination list includes a plurality of parameter value combinations, and the plurality of parameter value combinations has priorities.

In a possible implementation, the method further includes: establishing, by the SMF device, the first PDU session according to a second parameter value combination in the parameter value combination list if the first parameter value combination in the parameter value combination list does not satisfy a requirement.

In a possible implementation, a priority of the first parameter value combination is higher than that of the second parameter value combination.

In a possible implementation, the at least one parameter used to establish the PDU session includes at least one of the following parameters: a radio access technology RAT type, a session and service continuity mode, single-network slice selection assistance information S-NSSAI, and a data network name DNN.

A fifth aspect provides a terminal device, configured to perform the method in the foregoing first aspect or any possible implementation of the first aspect. Specifically, the terminal device includes units configured to perform the method in the foregoing first aspect or any possible implementation of the first aspect.

A sixth aspect provides a terminal device, configured to perform the method in the foregoing second aspect or any possible implementation of the second aspect. Specifically, the terminal device includes units configured to perform the method in the foregoing second aspect or any possible implementation of the second aspect.

A seventh aspect provides an SMF device, configured to perform the method in the foregoing third aspect or any possible implementation of the third aspect. Specifically, the SMF device includes units configured to perform the method in the foregoing third aspect or any possible implementation of the third aspect.

An eighth aspect provides an SMF device, configured to perform the method in the foregoing fourth aspect or any possible implementation of the fourth aspect. Specifically, the SMF device includes units configured to perform the method in the foregoing fourth aspect or any possible implementation of the fourth aspect.

A ninth aspect provides a terminal device, and the terminal device includes: a memory, a processor, an input interface and an output interface. The memory, the processor, the input interface and the output interface are connected by using a bus system. The memory is configured to store an instruction, and the processor is configured to execute the instruction stored in the memory, to perform the method in the foregoing first aspect or any possible implementation of the first aspect.

A tenth aspect provides a terminal device, and the terminal device includes: a memory, a processor, an input interface and an output interface. The memory, the processor, the input interface and the output interface are connected by using a bus system. The memory is configured to store an instruction, and the processor is configured to execute the instruction stored in the memory, to perform the method in the foregoing second aspect or any possible implementation of the second aspect.

An eleventh aspect provides an SMF device, and the SMF device includes: a memory, a processor, an input interface and an output interface. The memory, the processor, the input interface and the output interface are connected by using a bus system. The memory is configured to store an instruction, and the processor is configured to execute the instruction stored in the memory, to perform the method in the foregoing third aspect or any possible implementation of the third aspect.

A twelfth aspect provides an SMF device, and the SMF device includes: a memory, a processor, an input interface and an output interface. The memory, the processor, the input interface and the output interface are connected by using a bus system. The memory is configured to store an instruction, and the processor is configured to execute the instruction stored in the memory, to perform the method in the foregoing fourth aspect or any possible implementation of the fourth aspect.

A thirteenth aspect provides a data transmission method, including: sending, by a terminal device, a first request message to a network device, where the first request message is used to apply to perform session establishment of N data flows in a first protocol data unit PDU session; and receiving, by the terminal device, a response message that is of the first request message and that is sent by the network device, where the response message is used to indicate that the network device refuses to perform session establishment of M data flows of the N data flows in the first PDU session, both N and M are positive integers, and N is greater than or equal to M.

The network device feeds back a session establishment status to the terminal device, so that the terminal device can adjust a session establishment policy in time, thereby facilitating improvement in performance of a communications system.

In a possible implementation, the response message carries a refusal cause value, and the refusal cause value is used to indicate that the first PDU session does not support the M data flows.

The refusal cause value is carried in the response message, so that when the terminal device learns, according to the response message, that the cause is being not supported by the PDU session, the terminal device may properly adjust the PDU session, and re-initiate session establishment or modification to the network device. Therefore, a possibility that the PDU session is established successfully may be increased.

In a possible implementation, the response message carries an identifier of each of the M data flows.

In a possible implementation, the method further includes: sending, by the terminal device in response to the response message, a second request message to the network device, where the second request message is used to apply to perform session establishment of at least one of the M data flows in a second PDU session.

In a possible implementation, the first request message carries an identifier of the first PDU session, the second request message carries an identifier of the second PDU session, and the second PDU session is the first PDU session obtained after the identifier of the first PDU session is adjusted.

In a possible implementation, before the terminal device responds to the response message, the method further includes: adjusting, by the terminal device, an establishment parameter of the second PDU session other than the first PDU session according to the M data flows.

In a possible implementation, the response message carries an identifier of the second PDU session.

In a possible implementation, the network device is a session management function SMF device.

A fourteenth aspect provides a data transmission method, including: receiving, by a network device, a first request message sent by a terminal device, where the first request message is used to apply to perform session establishment of N data flows in a first protocol data unit PDU session; and sending, by the network device, a response message of the first request message to the terminal device, where the response message is used to indicate that the network device refuses to perform session establishment of M data flows of the N data flows in the first PDU session, both N and M are positive integers, and N is greater than or equal to M.

In a possible implementation, the response message carries a refusal cause value, and the refusal cause value is used to indicate that the first PDU session does not support the M data flows.

In a possible implementation, the response message carries an identifier of each of the M data flows.

In a possible implementation, the method further includes: receiving, by the network device, a second request message sent by the terminal device, where the second request message is used to apply to perform session establishment of at least one of the M data flows in a second PDU session.

In a possible implementation, the response message carries an identifier of the second PDU session allowed by the network device other than the first PDU session.

In a possible implementation, the network device is a session management function SMF device, and the method further includes: triggering, by the SMF device according to the first request message, an access network device to perform session establishment of the N data flows in the first PDU session; and receiving, by the SMF device, a data flow list that corresponds to the first PDU session and that is sent by the access network device, where the data flow list includes the M data flows or (N-M) data flows of the N data flows received by the first PDU session.

A fifteenth aspect provides a data transmission method, including: obtaining, by a terminal device according to an identifier of each of at least one rule in a UE route selection policy URSP, the at least one rule respectively; and initiating, by the terminal device respectively to a network device according to the at least one rule, establishment or modification of at least one protocol data unit PDU session in a one-to-one correspondence with the at least one rule.

A rule identifier is introduced, so that the terminal device may obtain a rule according to the rule identifier, instead of delivering, by the network device, all rules to the terminal device at a time, thereby alleviating a pressure of the network device and improving communication flexibility.

In a possible implementation, the at least one rule is a plurality of rules, and the initiating, by the terminal device respectively to a network device according to the plurality of rules, establishment or modification of a plurality of protocol data unit PDU sessions in a one-to-one correspondence with the plurality of rules includes: initiating, by the terminal device, establishment or modification of the plurality of PDU sessions to the network device sequentially according to priorities of the plurality of rules.

Optionally, a priority of each rule may be represented by an identifier of each rule.

In a possible implementation, a first rule of the at least one rule includes at least one of the following parameters: a radio access technology RAT, a session and service continuity mode, single-network slice selection assistance information S-NSSAI, a splitting type, a data network name DNN, a PDU session type, and a data flow filter.

In a possible implementation, a first parameter of the at least one parameter includes a plurality of values representing priorities, and the initiating, by the terminal device, establishment or modification of a first protocol data unit PDU session to a network device according to the first rule includes: initiating, by the terminal device, establishment or modification of the first PDU session to the network device according to the priorities of the plurality of values.

In a possible implementation, the initiating, by the terminal device, establishment or modification of a first protocol data unit PDU session to a network device according to a first rule of the at least one rule includes: sending, by the terminal device, a first request message to the network device according to the first rule, where the first request message is used to request the network device to perform session establishment of N data flows in the first PDU session; and after the initiating, by the terminal device, establishment or modification of a first protocol data unit PDU session to the network device according to the first rule, the method further includes: receiving, by the terminal device, a response message that is of the first request message and that is sent by the network device, where the response message is used to indicate that the network device refuses to perform session establishment of M data flows of the N data flows in the first PDU session, both N and M are positive integers, and N is greater than or equal to M.

In a possible implementation, the response message carries a refusal cause value, and the refusal cause value is used to indicate at least one of the following cases: being not supported by the PDU session, being not allowed by RAT access, an unsatisfactory session and service continuity mode, incorrect S-NSSAI, being not supported by a DNN, and an unidentifiable PDU session identifier.

In a possible implementation, the method further includes: adjusting, by the terminal device in response to the response message, a value of a parameter that is in the first rule and that corresponds to the refusal cause value; and sending, by the terminal device, a second request message to the network device according to the adjusted first rule, where the second request message is used to request the network device to perform session establishment of at least one of the M data flows in the first PDU session.

In a possible implementation, the parameter that is in the first rule and that corresponds to the refusal cause value includes a plurality of values representing priorities, and the adjusting, by the terminal device in response to the response message, a value of a parameter that is in the first rule and that corresponds to the refusal cause value includes: adjusting, by the terminal device in response to the response message, the value of the parameter that is in the first URSP and that corresponds to the refusal cause value into a value whose priority is higher than that for initiating establishment of the first PDU session previous time.

In a possible implementation, the response message carries a value, allowed by the network device, of the parameter that is in the first rule and that corresponds to the refusal cause value, and the adjusting, by the terminal device in response to the response message, the value of the parameter that is in the first URSP and that corresponds to the refusal cause value includes: adjusting, by the terminal device, the value of the parameter that is in the first rule and that corresponds to the refusal cause value into the value, allowed by the network device, of the parameter that is in the first rule and that corresponds to the refusal cause value.

In a possible implementation, the method further includes: receiving, the terminal device, an identifier of a second rule other than the first rule of the at least one rule in the URSP and an identifier of the first rule that are sent by the network device; and the obtaining, by the terminal device, the first rule according to the identifier of the first rule includes: obtaining, by the terminal device after establishing a second PDU session corresponding to the second rule, the first rule through a user plane according to the identifier of the first rule; or triggering, by the terminal device according to the identifier of the first rule, the network device to deliver the first rule through a control plane.

In a possible implementation, the method further includes: receiving, by the terminal device, an identifier of a server; and the obtaining, by the terminal device after establishing a second PDU session corresponding to the second rule, the first rule through a user plane according to the identifier of the first rule includes: obtaining, by the terminal device after establishing the second PDU session corresponding to the second rule, the first rule through the user plane according to the identifier of the first rule and the identifier of the server.

In a possible implementation, a priority of the second rule is higher than a priority of the first rule.

In a possible implementation, the obtaining, by a terminal device according to an identifier of each of at least one rule in a UE route selection policy URSP, the at least one rule respectively includes: obtaining, by the terminal device, the at least one rule according to the identifier of each of the at least one rule when the terminal device performs network registration.

A sixteenth aspect provides a data transmission method, including: sending, by a network device when a terminal device performs network registration, a plurality of rules in a UE route selection policy URSP to the terminal device through a plurality of messages.

The URSP policy is obtained in batches, so that a network pressure may be effectively reduced, and communication flexibility may be effectively improved.

In a possible implementation, the sending, by a network device when a terminal device performs network registration, a plurality of rules in a UE route selection policy URSP to the terminal device through a plurality of messages includes: sending, by the network device when the terminal device performs network registration, the plurality of rules to the terminal device sequentially through a plurality of messages of a control plane according to priorities of the plurality of rules.

In a possible implementation, the network device is a policy control function PCF device.

A seventeenth aspect provides a data transmission method, including: sending, by a network device when a terminal device performs network registration, an identifier of a second rule other than a first rule in a UE route selection policy URSP and an identifier of the first rule to the terminal device, so that after establishing a second PDU session corresponding to the second rule, the terminal device obtains the first rule through a user plane according to the identifier of the first rule.

The URSP policy is obtained in batches, so that a network pressure may be effectively reduced, and communication flexibility may be effectively improved.

In a possible implementation, the method further includes: sending, by the network device, an identifier of a server to the terminal device, so that after establishing the second PDU session corresponding to the second rule, the terminal device obtains the first rule through the user plane according to the identifier of the first rule and the identifier of the server.

In a possible implementation, the network device is a policy control function PCF device.

An eighteenth aspect provides a terminal device, configured to perform the method in the foregoing thirteenth aspect or any possible implementation of the thirteenth aspect. Specifically, the terminal device includes units configured to perform the method in the foregoing thirteenth aspect or any possible implementation of the thirteenth aspect.

A nineteenth aspect provides a network device, configured to perform the method in the foregoing fourteenth aspect or any possible implementation of the fourteenth aspect. Specifically, the network device includes units configured to perform the method in the foregoing fourteenth aspect or any possible implementation of the fourteenth aspect.

A twentieth aspect provides a terminal device, configured to perform the method in the foregoing fifteenth aspect or any possible implementation of the fifteenth aspect. Specifically, the terminal device includes units configured to perform the method in the foregoing fifteenth aspect or any possible implementation of the fifteenth aspect.

A twenty first aspect provides a network device, configured to perform the method in the foregoing sixteenth aspect or any possible implementation of the sixteenth aspect. Specifically, the network device includes units configured to perform the method in the foregoing sixteenth aspect or any possible implementation of the sixteenth aspect.

A twenty second aspect provides a network device, configured to perform the method in the foregoing seventeenth aspect or any possible implementation of the seventeenth aspect. Specifically, the network device includes units configured to perform the method in the foregoing seventeenth aspect or any possible implementation of the seventeenth aspect.

A twenty third aspect provides a terminal device, and the terminal device includes: a memory, a processor, an input interface and an output interface. The memory, the processor, the input interface and the output interface are connected by using a bus system. The memory is configured to store an instruction, and the processor is configured to execute the instruction stored in the memory, to perform the method in the foregoing thirteenth aspect or any possible implementation of the thirteenth aspect.

A twenty fourth aspect provides a network device, and the network device includes: a memory, a processor, an input interface and an output interface. The memory, the processor, the input interface and the output interface are connected by using a bus system. The memory is configured to store an instruction, and the processor is configured to execute the instruction stored in the memory, to perform the method in the foregoing fourteenth aspect or any possible implementation of the fourteenth aspect.

A twenty fifth aspect provides a terminal device, and the terminal device includes: a memory, a processor, an input interface and an output interface. The memory, the processor, the input interface and the output interface are connected by using a bus system. The memory is configured to store an instruction, and the processor is configured to execute the instruction stored in the memory, to perform the method in the foregoing fifteenth aspect or any possible implementation of the fifteenth aspect.

A twenty sixth aspect provides a network device, and the network device includes: a memory, a processor, an input interface and an output interface. The memory, the processor, the input interface and the output interface are connected by using a bus system. The memory is configured to store an instruction, and the processor is configured to execute the instruction stored in the memory, to perform the method in the foregoing sixteenth aspect or any possible implementation of the sixteenth aspect.

A twenty seventh aspect provides a network device, and the network device includes: a memory, a processor, an input interface and an output interface. The memory, the processor, the input interface and the output interface are connected by using a bus system. The memory is configured to store an instruction, and the processor is configured to execute the instruction stored in the memory, to perform the method in the foregoing seventeenth aspect or any possible implementation of the seventeenth aspect.

A twenty eighth aspect provides a computer storage medium, configured to store a computer software instruction used for performing the method in the foregoing first aspect or any possible implementation of the first aspect, the method in the foregoing second aspect or any possible implementation of the second aspect, the method in the foregoing third aspect or any possible implementation of the third aspect, the method in the foregoing fourth aspect or any possible implementation of the fourth aspect, the method in the foregoing thirteenth aspect or any possible implementation of the thirteenth aspect, the method in the foregoing fourteenth aspect or any possible implementation of the fourteenth aspect, the method in the foregoing fifteenth aspect or any possible implementation of the fifteenth aspect, the method in the foregoing sixteenth aspect or any possible implementation of the sixteenth aspect, or the method in the foregoing seventeenth aspect or any possible implementation of the seventeenth aspect, and the computer storage medium includes a program designed to perform the foregoing aspects.

A twenty ninth aspect provides a computer program including an instruction, and when the computer program is run on a computer, the computer is enabled to perform the method in the foregoing first aspect or any optional implementation of the first aspect, the method in the foregoing second aspect or any optional implementation of the second aspect, the method in the foregoing third aspect or any optional implementation of the third aspect, the method in the foregoing fourth aspect or any optional implementation of the fourth aspect, the method in the foregoing thirteenth aspect or any possible implementation of the thirteenth aspect, the method in the foregoing fourteenth aspect or any possible implementation of the fourteenth aspect, the method in the foregoing fifteenth aspect or any possible implementation of the fifteenth aspect, the method in the foregoing sixteenth aspect or any possible implementation of the sixteenth aspect, or the method in the foregoing seventeenth aspect or any possible implementation of the seventeenth aspect.

A thirtieth aspect provides a computer program product including an instruction. The computer program product includes a computer program instruction, and the computer program instruction enables a computer to perform the method in the foregoing first aspect or any optional implementation of the first aspect, the method in the foregoing second aspect or any optional implementation of the second aspect, the method in the foregoing third aspect or any optional implementation of the third aspect, the method in the foregoing fourth aspect or any optional implementation of the fourth aspect, the method in the foregoing thirteenth aspect or any possible implementation of the thirteenth aspect, the method in the foregoing fourteenth aspect or any possible implementation of the fourteenth aspect, the method in the foregoing fifteenth aspect or any possible implementation of the fifteenth aspect, the method in the foregoing sixteenth aspect or any possible implementation of the sixteenth aspect, or the method in the foregoing seventeenth aspect or any possible implementation of the seventeenth aspect.

These aspects or other aspects of this disclosure are simpler and more comprehensible in descriptions of the following embodiments.

DETAILED DESCRIPTION

The technical solutions in the embodiments of this disclosure are described clearly with reference to the accompanying drawings in the embodiments of this disclosure below.

It should be understood that the technical solutions of the embodiments of this disclosure may be applied to various communications systems, such as: a Global System for Mobile Communications (GSM), a Code Division Multiple Access (CDMA) system, a Wideband Code Division Multiple Access (WCDMA), a General Packet Radio Service (GPRS), an LTE system, an LTE Frequency Division Duplex (FDD) system, an LTE Time Division Duplex (TDD) system, a Universal Mobile Telecommunications System (UMTS) system, a Worldwide Interoperability for Microwave Access (WiMAX) communications system, a New Radio (NR) system, and a future 5G communications system.

Particularly, the technical solutions of the embodiments of this disclosure may be applied to various communications systems based on a Non-Orthogonal Multiple Access technology, for example, a Sparse Code Multiple Access (SCMA) system and a Low Density Signature (LDS) system. Certainly, the SCMA system and the LDS system may also be referred to as other names in the field of communications. Further, the technical solutions of the embodiments of this disclosure may be applied to multi-carrier transmission systems in which the Non-Orthogonal Multiple Access technology is used, for example, an Orthogonal Frequency Division Multiplexing (OFDM) system, a Filter Bank Multi-Carrier (FBMC) system, a Generalized Frequency Division Multiplexing (GFDM) system, and a filtered-Orthogonal Frequency Division Multiplexing (F-OFDM) system in which the Non-Orthogonal Multiple Access technology is used.

Figure 1:
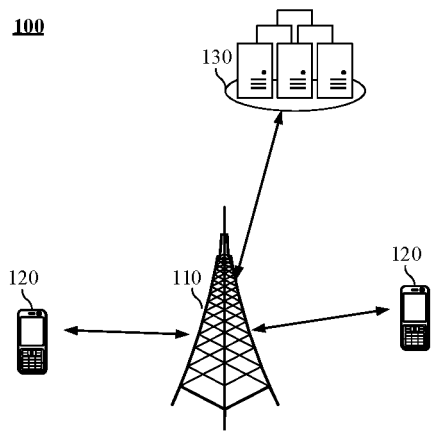
FIG. 1 is a schematic diagram of an application scenario according to an embodiment of this disclosure.

FIG. 1 shows a wireless communications system 100 to which an embodiment of this disclosure is applied. The wireless communications system 100 may include an access network device 110. The access network device 110 may be a device communicating with a terminal device. The access network device 110 may provide communications coverage to a particular geographic area, and may communicate with a terminal device (for example, UE) located within the coverage area. Optionally, the access network device 110 may be a next generation radio access network (NG RAN), a base station (gNB) in an NR system, or a wireless controller in a cloud radio access network (CRAN), or the access network device may be a relay station, an access point, an in-vehicle device, a wearable device, a network device in a future evolved public land mobile network (PLMN), or the like. Optionally, the access network device 110 may be a base station in an LTE system, for example, an evolved universal terrestrial radio access network (E-UTRAN) device.

The wireless communications system 100 further includes at least one terminal device 120 located within the coverage range of the access network device 110. The terminal device 120 may be mobile or fixed. Optionally, the terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN or the like.

The wireless communications system 100 further includes a core network device 130 communicating with the access network device. Optionally, the core network device 130 may be a 5G core network device, for example, an access and mobility management function (AMF), and for another example, a session management function (SMF). Optionally, the core network device 130 may be an evolved packet core (EPC) device in an LTE network, for example, a session management function+core packet gateway (SMF+PGW-C) device.

It should be understood that, the SMF+PGW-C may implement functions that both the SMF and the PGW-C can implement.

Optionally, in this embodiment of this disclosure, the AMF may perform information exchange with the SMF. For example, the SMF obtains some information on a radio access network side from the AMF.

FIG. 1 shows one access network device, one core network device, and two terminal devices as an example. Optionally, the wireless communications system 100 may include a plurality of access network devices and coverage of each access network device may include another quantity of terminal devices. This is not limited in this embodiment of this disclosure.

Optionally, the wireless communications system 100 may further include other network entities such as a mobility management entity (MME), a unified data management (UDM) function, and an authentication server function (AUSF), a user plane function (UPF), and a signaling gateway (SGW). This is not limited in this embodiment of this disclosure.

It should be understood that, terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

Figure 2:
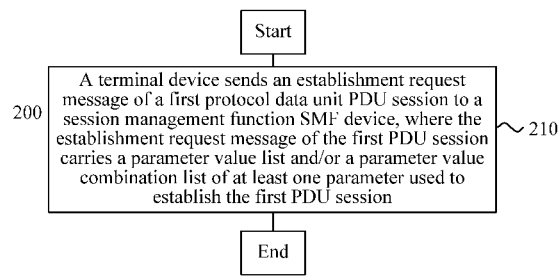
FIG. 2 is a schematic block diagram of a data transmission method according to an embodiment of this disclosure.

FIG. 2 is a schematic block diagram of a data transmission method 200 according to an embodiment of this disclosure. A terminal device shown in FIG. 2 may be a terminal device shown in FIG. 1, and an SMF device shown in FIG. 2 may be a core network device shown in FIG. 1. The method 200 includes some or all of the following content:

S210. A terminal device sends an establishment request message of a first protocol data unit PDU session to a session management function SMF device, where the establishment request message of the first PDU session carries a parameter value list and/or a parameter value combination list of at least one parameter used to establish the PDU session.

Specifically, when the terminal device requests to establish a protocol data unit (PDU) session, the terminal device may send a non-access stratum (NAS) message to the SMF device, where the NAS message may carry an identifier (ID) of a to-be-established PDU session, or may carry a parameter value list and/or a parameter value combination list of at least one parameter used to establish the PDU session. After receiving the parameter value list and/or the parameter value combination list, the SMF device may perform PDU session establishment according to the parameter value list and/or the parameter value combination list.

Optionally, in this embodiment of this disclosure, the parameter for establishing a PDU session may be, for example, at least one of a radio access technology (RAT) type, a session and service continuity (SSC) mode, single-network slice selection assistance information (S-NSSAI), and a data network name (DNN). The parameter may be further another possible parameter, for example, a splitting type. This embodiment of this disclosure is not limited thereto.

Specifically, the parameter value list may be shown in Table 1.

TABLE 1

| | |
|---|---|
| RAT access type | 3gpp access |
| Session and service continuity mode | SSC-1 |
| Single-network slice selection assistance selecting information | S-NSSAI-1. S-NSSAI-2 |
| DNN | DNN-1, DNN-2, DNN3 |

It should be understood that, a parameter in the parameter value list may have a plurality of values, and the plurality of values may have priorities. For example, the S-NSSAI in Table 1 includes S-NSSAI-1 and S-NSSAI-2, where a priority of the S-NSSAI-1 is higher than that of the S-NSSAI-2. That is to say, after receiving the parameter value list, the SMF device may first select the S-NSSAI-1 to perform PDU session establishment. If the S-NSSAI-1 does not satisfy an establishment requirement, the SMF device may select the S-NSSAI-1 to perform PDU session establishment, until none of all values of the S-NSSAI in the parameter value list satisfies the establishment requirement.

Optionally, a plurality of values of a parameter in the parameter value list may not have priorities. For example, after the SMF device receives the parameter value list, the SMF device may first select one value from a plurality of values of the S-NSSAI to perform PDU session establishment. If the value does not satisfy a requirement, the SMF device may again select one value to perform PDU session establishment, until a selected parameter value satisfies a PDU session establishment requirement or until none of a plurality of values of the parameter sent by the terminal device satisfies a requirement.

Specifically, the parameter value combination list may be shown in Table 2.

TABLE 2

| | Combination 1 | Combination 2 | Combination 3 |
|---|---|---|---|
| RAT access type | 3gpp access | 3gpp access | Non-3gpp access |
| Session and service continuity mode | SSC-1 | / | SSC-2 |
| Single-network slice selection assistance selecting information | S-NSSAI-1 | S-NSSAI-1 | / |
| DNN | DNN-1 | DNN-2 | DNN-3 |

It should be understood that, a parameter value combination in the parameter value combination list may include a value of each parameter of at least one parameter, and a plurality of parameter value combinations in the parameter value combination list may include a same parameter, or may include different parameters, or included parameters are of different types. The plurality of parameter value combinations may also have priorities. For example, a priority of the combination 1 in Table 2 is higher than that of the combination 2. That is to say, after receiving the parameter value combination list, the SMF device may first select the combination 1 to perform PDU session establishment. If the combination 1 does not satisfy an establishment requirement, the SMF device may select the combination 2 to perform PDU session establishment, until none of all parameter value combinations in the parameter value combination list satisfies the establishment requirement.

Therefore, in the data transmission method according to this embodiment of this disclosure, the terminal device sends a parameter value list and/or a parameter value combination list of a PDU session to the SMF device, to facilitate increase in a probability that the PDU session is established successfully.

Further, the RAT type may include at least one of the following access technologies: new radio NR, long term evolution LTE, global system for mobile communications GSM, code division multiple access CDMA, general packet radio service GPRS, a wireless local area network WLAN, and satellite access. The RAT type may further include at least one of the following access technologies: 3rd Generation Partnership Project 3GPP and non-3GPP. The RAT type may be any combination of the foregoing enumerated various access technologies.

Optionally, in this embodiment of this disclosure, the method further includes: receiving, by the terminal device, a response message sent by the SMF device, where the response message carries a value of a cause why the first PDU session is established unsuccessfully.

If the SMF device establishes the PDU session unsuccessfully, the SMF device may response to the terminal device with a response message, and the response message may carry the value of the cause why the PDU session is established unsuccessfully. After receiving the value of the cause, the terminal device may make some corresponding adjustment.

Further, the value of the cause is used to indicate that none of values in a priority list of a first parameter of the at least one parameter used to establish the PDU session satisfies a requirement.

If the SMF device attempts each of all values of a parameter reported by the terminal device, and none of the values of the parameter satisfies the PDU session establishment requirement, the SMF device may directly send a response message to the terminal device, to indicate that because values of the parameter do not satisfy the requirement, PDU session establishment fails.

Further, the SMF device may further add an allowed value of the parameter that causes PDU session establishment failure to the response message, and the terminal device may initiate PDU session establishment again to the SMF device with reference to the value allowed by the SMF device or directly initiate a modification request of an established PDU session.

Figure 3:
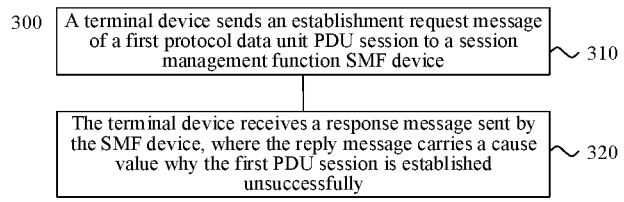
FIG. 3 is another schematic block diagram of a data transmission method according to an embodiment of this disclosure.

FIG. 3 is a schematic block diagram of a data transmission method 300 according to an embodiment of this disclosure. A terminal device shown in FIG. 3 may be a terminal device shown in FIG. 1, and an SMF device shown in FIG. 3 may be a core network device shown in FIG. 1. The method 300 includes some or all of the following content:

S310. A terminal device sends an establishment request message of a first protocol data unit PDU session to a session management function SMF device.

S320. The terminal device receives a response message sent by the SMF device, where the response message carries a value of a cause why the first PDU session is established unsuccessfully.

Specifically, when the terminal device requests to establish a PDU session, the terminal device may send an NAS message to the SMF device, where the NAS message may carry an ID of the to-be-established PDU session. After receiving the NAS message, the SMF device may perform PDU session establishment with reference to some parameters. If the PDU session fails to be established, the SMF device may response to the terminal device with a response message, where the response message may carry a cause why the PDU session fails to be established. For example, one or some parameters do not satisfy a requirement.

Therefore, in the data transmission method according to this embodiment of this disclosure, a session establishment status is fed back to the terminal device, so that the terminal device can adjust a session establishment policy in time, thereby facilitating improvement in performance of a communications system.

Optionally, the terminal device may add a parameter value list or a parameter value combination list used to establish the PDU session to an establishment request message of the PDU session, that is, the foregoing NAS message, and the parameter may be, for example, at least one of a radio access technology (RAT) type, a session and service continuity mode, single-network slice selection assistance information (S-NSSAI), and a data network name (DNN). The parameter may be further another possible parameter, for example, a splitting type. This embodiment of this disclosure is not limited thereto.

Optionally, in this embodiment of this disclosure, a parameter in the parameter value list may have a plurality of values, and the plurality of values may have priorities. For example, the S-NSSAI in Table 1 includes S-NSSAI-1 and S-NSSAI-2, where a priority of the S-NSSAI-1 is higher than that of the S-NSSAI-2. That is to say, after receiving the parameter value list, the SMF device may first select the S-NSSAI-1 to perform PDU session establishment. If the S-NSSAI-1 does not satisfy an establishment requirement, the SMF device may select the S-NSSAI-1 to perform PDU session establishment, until none of all values of the S-NSSAI in the parameter value list satisfies the establishment requirement.

Optionally, a plurality of values of a parameter in the parameter value list may not have priorities. For example, after the SMF device receives the parameter value list, the SMF device may first select one value from a plurality of values of the S-NSSAI to perform PDU session establishment. If the value does not satisfy a requirement, the SMF device may again select one value to perform PDU session establishment, until a selected parameter value satisfies a PDU session establishment requirement or until none of a plurality of values of the parameter sent by the terminal device satisfies a requirement.

It should be understood that, a parameter value combination in the parameter value combination list may include a value of each parameter of at least one parameter, and a plurality of parameter value combinations in the parameter value combination list may include a same parameter, or may include different parameters, or included parameters are of different types. The plurality of parameter value combinations may also have priorities. For example, a priority of a parameter value combination of a second column in Table 2 is higher than that of a parameter value combination of a third column. That is to say, after receiving the parameter value combination list, the SMF device may first select the parameter value combination of the second column to perform PDU session establishment. If the parameter value combination of the second column does not satisfy the establishment requirement, the SMF device may select the parameter value combination of the third column to perform PDU session establishment, until none of all parameter value combinations in the parameter value combination list satisfies the establishment requirement.

Optionally, in this embodiment of this disclosure, the value of the cause is used to indicate that none of the parameter values of the first parameter in the parameter value list satisfies an establishment requirement.

The terminal device may add one or more values of some parameters to the NAS message.

If the terminal device adds one value of some parameters to the NAS message, the SMF device directly performs PDU session establishment according to the parameter value added by the terminal device. If the parameter value does not satisfy the establishment requirement, the SMF replies to the terminal device with a cause. That is to say, the parameter value added by the terminal device does not satisfy the requirement. The terminal device may further perform adjustment.

If the terminal device adds a plurality of values of some parameters to the NAS message, the SMF device may first select one value from the plurality of values to perform PDU session establishment. If the value does not satisfy the requirement, the SMF device may again select one value to perform PDU session establishment, until a selected parameter value satisfies the PDU session establishment requirement or until none of a plurality of values of the parameter sent by the terminal device satisfies a requirement. If none of values of one or more parameters sent by the terminal device satisfies the PDU session establishment requirement, the SMF device may directly send a response message to the terminal device, to indicate PDU session establishment failure. A plurality of values of a parameter in the parameter value list sent by the terminal device to the SMF device may have priorities. In other words, after receiving a priority list of a parameter, the SMF device may first select a value having a first priority of the parameter to perform PDU session establishment. If the parameter value list does not include the value having the first priority, or the value having the first priority does not satisfy the establishment requirement, the SMF device may select a value having a second priority to perform PDU session establishment, until a value of the parameter satisfies the PDU session establishment requirement or none of all values in the priority list of the parameter satisfies the establishment requirement.

Optionally, in this embodiment of this disclosure, the response message further carries a value, of the first parameter, allowed by the SMF device.

If the SMF device fails to establish the PDU session because a value of one or more parameters does not satisfy the establishment requirement, the SMF device may send an allowed value of the parameter to the terminal device, and there may be one or more allowed values.

Further, the RAT type may include at least one of the following access technologies: new radio NR, long term evolution LTE, global system for mobile communications GSM, code division multiple access CDMA, general packet radio service GPRS, a wireless local area network WLAN, and satellite access. The RAT type may further include at least one of the following access technologies: 3rd Generation Partnership Project (3GPP) and non-3GPP. The RAT type may be any combination of the foregoing enumerated various access technologies.

Optionally, in this embodiment of this disclosure, the method further includes: sending, by the terminal device in response to the response message, an establishment request message of a second PDU session to the SMF device.

Specifically, after the terminal device receives a response message sent by the SMF device, and the response message further carries a value of a cause why establishment of the first PDU session initiated by the terminal device is unsuccessful, the terminal device may make corresponding adjustment. For example, the terminal device may directly adjust a value of a parameter indicated by the value of the cause. In other words, if a value of a cause for refusal of the SMF device is that a parameter value used to establish a PDU session is inappropriate, the terminal device may make adjustment based on a value of the parameter for previously initiating PDU session establishment, and initiate a PDU session establishment request to the SMF device once again, to attempt to establish a PDU session successfully.

Optionally, the sending, by the terminal device in response to the response message, an establishment request message of a second PDU session to the SMF device includes: sending, by the terminal device in response to the response message, the establishment request message of the second PDU session to the SMF device according to a priority list of a value of at least one parameter of the at least one parameter used to establish the PDU session.

The terminal device may further perform adjustment according to a value of at least one parameter of parameters used to establish a PDU session. For example, the terminal device may first select one value from a plurality of values of a parameter to perform PDU session establishment. If the value does not satisfy the requirement, the terminal device may again select one value to perform PDU session establishment, until a selected parameter value satisfies the PDU session establishment requirement or until none of the plurality of values of the parameter satisfies the requirement. A parameter may be of a plurality of values having priorities. In other words, the terminal device may store a priority list of a parameter. After receiving the response message sent by the SMF device, the terminal device may first select a value having a first priority to perform PDU session establishment. If the priority list does not include the value having the first priority, or the value having the first priority does not satisfy the establishment requirement, the terminal device may select a value having a second priority to perform PDU session establishment, until a value of the parameter satisfies the PDU session establishment requirement or none of all values in the priority list of the parameter satisfies the establishment requirement.

Figure 4:
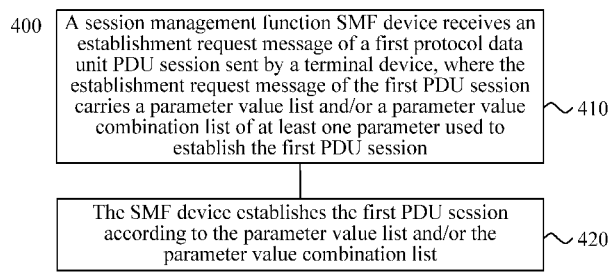
FIG. 4 is still another schematic block diagram of a data transmission method according to an embodiment of this disclosure.

FIG. 4 is a schematic block diagram of a data transmission method 400 according to an embodiment of this disclosure. As shown in FIG. 4, the method 400 includes some or all of the following content:

S410. A session management function SMF device receives an establishment request message of a first protocol data unit PDU session sent by a terminal device, where the establishment request message of the first PDU session carries a priority list of a plurality of values of each parameter of at least one parameter used to establish the first PDU session.

S420. The SMF device establishes the first PDU session according to the priority list of the plurality of values of each parameter.

Therefore, in the data transmission method according to this embodiment of this disclosure, the terminal device sends a priority list of a parameter for establishing a PDU session to the SMF device, to facilitate increase in a probability that the PDU session is established successfully.

Optionally, in this embodiment of this disclosure, the at least one parameter used to establish the PDU session includes at least one of the following parameters: a radio access technology RAT type, a session and service continuity mode, single-network slice selection assistance information S-NSSAI, and a data network name DNN.

Optionally, in this embodiment of this disclosure, the RAT type includes at least one of the following access technologies: new radio NR, long term evolution LTE, global system for mobile communications GSM, code division multiple access CDMA, general packet radio service GPRS, a wireless local area network WLAN, and satellite access.

Optionally, in this embodiment of this disclosure, the RAT type includes at least one of the following access technologies: 3rd Generation Partnership Project 3GPP and non-3GPP.

Optionally, in this embodiment of this disclosure, the method further includes: sending, by the SMF device, a response message to the terminal device, where the response message carries a value of a cause why the first PDU session is established unsuccessfully.

Optionally, in this embodiment of this disclosure, the value of the cause is used to indicate that none of values in a priority list of a first parameter of the at least one parameter used to establish the PDU session satisfies a requirement.

Optionally, in this embodiment of this disclosure, the response message further carries a value, of the first parameter, allowed by the SMF device.

Optionally, in this embodiment of this disclosure, after the sending, by the SMF device, a response message to the terminal device, the method further includes: receiving, by the SMF device, an establishment request message of a second PDU session or a modification request message of an established PDU session sent by the terminal device.

It should be understood that, interaction between the SMF device and the terminal device and related characteristics, functions and the like described for the SMF device correspond to related characteristics and functions of the terminal device. Moreover, related content has been described in detail in the foregoing method 200. For brevity, details are not described herein again.

Figure 5:
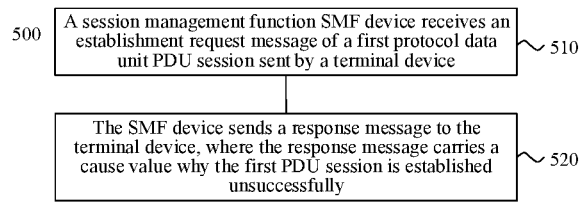
FIG. 5 is still another schematic block diagram of a data transmission method according to an embodiment of this disclosure.

FIG. 5 is a schematic block diagram of a data transmission method 500 according to an embodiment of this disclosure. As shown in FIG. 5, the method 500 includes some or all of the following content:

S510. A session management function SMF device receives an establishment request message of a first protocol data unit PDU session sent by a terminal device.

S520. The SMF device sends a response message to the terminal device, where the response message carries a value of a cause why the first PDU session is established unsuccessfully.

Therefore, in the data transmission method according to this embodiment of this disclosure, a session establishment status is fed back to the terminal device, so that the terminal device can adjust a session establishment policy in time, thereby facilitating improvement in performance of a communications system.

Optionally, in this embodiment of this disclosure, the establishment request message of the first PDU session carries at least one value of each parameter of at least one parameter used to establish the first PDU session, and the value of the cause is used to indicate that the at least one value of a first parameter of the at least one parameter used to establish the first PDU session does not satisfy an establishment requirement.

Optionally, in this embodiment of this disclosure, the response message further carries a value, of the first parameter, allowed by the SMF device.

Optionally, in this embodiment of this disclosure, the at least one value of the first parameter includes a plurality of values, and the establishment request message of the first PDU session carries a priority list of the plurality of values of the first parameter.

It should be understood that, interaction between the SMF device and the terminal device and related characteristics, functions and the like described for the SMF device correspond to related characteristics and functions of the terminal device. Moreover, related content has been described in detail in the foregoing method 300. For brevity, details are not described herein again.

It should be further understood that, sequence numbers of the foregoing processes do not mean execution orders in various embodiments of this disclosure. The execution orders of the processes should be determined according to functions and internal logic of the processes, and should not be construed as any limitation on the implementation processes of the embodiments of this disclosure.

Figure 6:
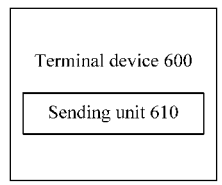
FIG. 6 is a schematic block diagram of a terminal device according to an embodiment of this disclosure.

FIG. 6 is a schematic block diagram of a terminal device 600 according to an embodiment of this disclosure. As shown in FIG. 6, the terminal device 600 includes:

a sending unit 610, configured to send an establishment request message of a first protocol data unit PDU session to a session management function SMF device, where the establishment request message of the first PDU session carries a parameter value list and/or a parameter value combination list of at least one parameter used to establish the first PDU session.

Therefore, the terminal device according to this embodiment of this disclosure sends a priority list of a parameter for establishing a PDU session to the SMF device, to facilitate increase in a probability that the PDU session is established successfully.

Optionally, in this embodiment of this disclosure, parameter values of a first parameter in the parameter value list include a plurality of values, and the plurality of values has priorities.

Optionally, in this embodiment of this disclosure, a first parameter value combination in the parameter value combination list includes a value of each parameter of the at least one parameter.

Optionally, in this embodiment of this disclosure, the parameter value combination list includes a plurality of parameter value combinations, and the plurality of parameter value combinations has priorities.

Optionally, in this embodiment of this disclosure, the at least one parameter used to establish the PDU session includes at least one of the following parameters: a radio access technology RAT type, a session and service continuity mode, single-network slice selection assistance information S-NSSAI, and a data network name DNN.

Optionally, in this embodiment of this disclosure, the RAT type includes at least one of the following access technologies: new radio NR, long term evolution LTE, global system for mobile communications GSM, code division multiple access CDMA, general packet radio service GPRS, a wireless local area network WLAN, and satellite access.

Optionally, in this embodiment of this disclosure, the RAT type includes at least one of the following access technologies: 3rd Generation Partnership Project 3GPP and non-3GPP.

Optionally, in this embodiment of this disclosure, the terminal device further includes: a receiving unit, configured to receive a response message sent by the SMF device, where the response message carries a value of a cause why the first PDU session is established unsuccessfully.

Optionally, in this embodiment of this disclosure, the value of the cause is used to indicate that none of the parameter values of the first parameter in the parameter value list satisfies an establishment requirement.

Optionally, in this embodiment of this disclosure, the response message further carries a value, of the first parameter, allowed by the SMF device.

Optionally, in this embodiment of this disclosure, the sending unit is further configured to: send, in response to the response message, an establishment request message of a second PDU session or a modification request message of an established PDU session to the SMF device.

It should be understood that, the terminal device 600 according to this embodiment of this disclosure may correspond to the terminal device in the method embodiment of this disclosure, and the foregoing and other operations and/or functions of units in the terminal device 600 are respectively used to implement corresponding procedures of the terminal device in the method in FIG. 2. For brevity, details are not described herein again.

Figure 7:
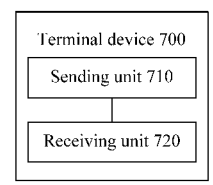
FIG. 7 is another schematic block diagram of a terminal device according to an embodiment of this disclosure.

FIG. 7 is a schematic block diagram of a terminal device 700 according to an embodiment of this disclosure. As shown in FIG. 7, the terminal device 700 includes:

a sending unit 710, configured to send an establishment request message of a first protocol data unit PDU session to a session management function SMF device; and a receiving unit 720, configured to receive a response message sent by the SMF device, where the response message carries a value of a cause why the first PDU session is established unsuccessfully.

Therefore, the terminal device according to this embodiment of this disclosure receives a session establishment status fed back by the SMF device, so that the terminal device can adjust a session establishment policy in time, thereby facilitating improvement in performance of a communications system.

Optionally, in this embodiment of this disclosure, the establishment request message of the first PDU session carries a parameter value list and/or a parameter value combination list of at least one parameter used to establish the first PDU session.

Optionally, in this embodiment of this disclosure, parameter values of a first parameter in the parameter value list include a plurality of values, and the plurality of values has priorities.

Optionally, in this embodiment of this disclosure, the value of the cause is used to indicate that none of the parameter values of the first parameter in the parameter value list satisfies an establishment requirement.

Optionally, in this embodiment of this disclosure, the response message further carries a value, of the first parameter, allowed by the SMF device.

Optionally, in this embodiment of this disclosure, a first parameter value combination in the parameter value combination list includes a value of each parameter of the at least one parameter.

Optionally, in this embodiment of this disclosure, the parameter value combination list includes a plurality of parameter value combinations, and the plurality of parameter value combinations has priorities.

Optionally, in this embodiment of this disclosure, the parameter used to establish the first PDU session includes at least one of the following parameters: a radio access technology RAT type, a session and service continuity mode, single-network slice selection assistance information S-NSSAI, and a data network name DNN.

Optionally, in this embodiment of this disclosure, the terminal device further includes: sending, by the terminal device in response to the response message, an establishment request message of a new PDU session to the SMF device.

Optionally, in this embodiment of this disclosure, the sending, by the terminal device in response to the response message, an establishment request message of a new PDU session to the SMF device includes: sending, by the terminal device in response to the response message, an establishment request message of a new PDU session to the SMF device according to a parameter value list of at least one parameter used to establish the PDU session.

It should be understood that, the terminal device 700 according to this embodiment of this disclosure may correspond to the terminal device in the method embodiment of this disclosure, and the foregoing and other operations and/or functions of units in the terminal device 700 are respectively used to implement corresponding procedures of the terminal device in the method in FIG. 3. For brevity, details are not described herein again.

Figure 8:
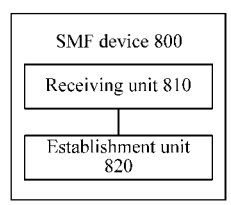
FIG. 8 is a schematic block diagram of an SMF device according to an embodiment of this disclosure.

FIG. 8 is a schematic block diagram of an SMF device 800 according to an embodiment of this disclosure. As shown in FIG. 8, the SMF device 800 includes:

a receiving unit 810, configured to receive an establishment request message of a first protocol data unit PDU session sent by a terminal device, where the establishment request message of the first PDU session carries a parameter value list and/or a parameter value combination list of at least one parameter used to establish the first PDU session; and an establishment unit 820, configured to establish the first PDU session according to the parameter value list and/or the parameter value combination list.

Therefore, the SMF device according to this embodiment of this disclosure establishes a PDU session according to a priority list that is of a parameter for establishing a PDU session and that is sent by the terminal device, to facilitate increase in a probability that the PDU session is established successfully.

Optionally, in this embodiment of this disclosure, parameter values of a first parameter in the parameter value list include a plurality of values, and the plurality of values has priorities.

Optionally, in this embodiment of this disclosure, the SMF device further includes: a sending unit, configured to send a response message to the terminal device, where the response message carries a value of a cause why the first PDU session is established unsuccessfully.

Optionally, in this embodiment of this disclosure, the value of the cause is used to indicate that none of the parameter values of the first parameter in the parameter value list satisfies an establishment requirement.

Optionally, in this embodiment of this disclosure, the response message further carries a value, of the first parameter, allowed by the SMF device.

Optionally, in this embodiment of this disclosure, the receiving unit is further configured to: receive an establishment request message of a second PDU session or a modification request message of an established PDU session sent by the terminal device.

Optionally, in this embodiment of this disclosure, a first parameter value combination in the parameter value combination list includes a value of each parameter of the at least one parameter.

Optionally, in this embodiment of this disclosure, the parameter value combination list includes a plurality of parameter value combinations, and the plurality of parameter value combinations has priorities.

Optionally, in this embodiment of this disclosure, the establishment unit is further configured to: establish the first PDU session according to a second parameter value combination in the parameter value combination list if the first parameter value combination in the parameter value combination list does not satisfy a requirement.

Optionally, in this embodiment of this disclosure, a priority of the first parameter value combination is higher than that of the second parameter value combination.

Optionally, in this embodiment of this disclosure, the at least one parameter used to establish the PDU session includes at least one of the following parameters: a radio access technology RAT type, a session and service continuity mode, single-network slice selection assistance information S-NSSAI, and a data network name DNN.

Optionally, in this embodiment of this disclosure, the RAT type includes at least one of the following access technologies: new radio NR, long term evolution LTE, global system for mobile communications GSM, code division multiple access CDMA, general packet radio service GPRS, a wireless local area network WLAN, and satellite access.

Optionally, in this embodiment of this disclosure, the RAT type includes at least one of the following access technologies: 3rd Generation Partnership Project 3GPP and non-3GPP.

It should be understood that, the SMF device 800 according to this embodiment of this disclosure may correspond to the SMF device in the method embodiment of this disclosure, and the foregoing and other operations and/or functions of units in the SMF device 800 are respectively used to implement corresponding procedures of the SMF device in the method in FIG. 4. For brevity, details are not described herein again.

Figure 9:
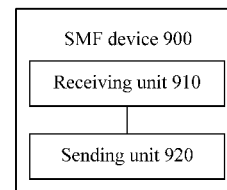
FIG. 9 is another schematic block diagram of an SMF device according to an embodiment of this disclosure.

FIG. 9 is a schematic block diagram of an SMF device 900 according to an embodiment of this disclosure. As shown in FIG. 9, the SMF device 900 includes:

a receiving unit 910, configured to receive an establishment request message of a first protocol data unit PDU session sent by a terminal device; and a sending unit 920, configured to send a response message to the terminal device, where the response message carries a value of a cause why the first PDU session is established unsuccessfully.

Therefore, the SMF device according to this embodiment of this disclosure feeds back a session establishment status to the terminal device, so that the terminal device can adjust a session establishment policy in time, thereby facilitating improvement in performance of a communications system.

Optionally, in this embodiment of this disclosure, the establishment request message of the first PDU session carries a parameter value list and/or a parameter value combination list of at least one parameter used to establish the first PDU session.

Optionally, in this embodiment of this disclosure, parameter values of a first parameter in the parameter value list include a plurality of values, and the plurality of values has priorities.

Optionally, in this embodiment of this disclosure, the value of the cause is used to indicate that none of the parameter values of the first parameter in the parameter value list satisfies an establishment requirement.

Optionally, in this embodiment of this disclosure, the response message further carries a value, of the first parameter, allowed by the SMF device.

Optionally, in this embodiment of this disclosure, a first parameter value combination in the parameter value combination list includes a value of each parameter of the at least one parameter.

Optionally, in this embodiment of this disclosure, the parameter value combination list includes a plurality of parameter value combinations, and the plurality of parameter value combinations has priorities.

Optionally, in this embodiment of this disclosure, the establishment unit is further configured to: establish the first PDU session according to a second parameter value combination in the parameter value combination list if the first parameter value combination in the parameter value combination list does not satisfy a requirement.

Optionally, in this embodiment of this disclosure, a priority of the first parameter value combination is higher than that of the second parameter value combination.

Optionally, in this embodiment of this disclosure, the at least one parameter used to establish the PDU session includes at least one of the following parameters: a radio access technology RAT type, a session and service continuity mode, single-network slice selection assistance information S-NSSAI, and a data network name DNN.

It should be understood that, the SMF device 900 according to this embodiment of this disclosure may correspond to the SMF device in the method embodiment of this disclosure, and the foregoing and other operations and/or functions of units in the SMF device 900 are respectively used to implement corresponding procedures of the SMF device in the method in FIG. 5. For brevity, details are not described herein again.

Figure 10:
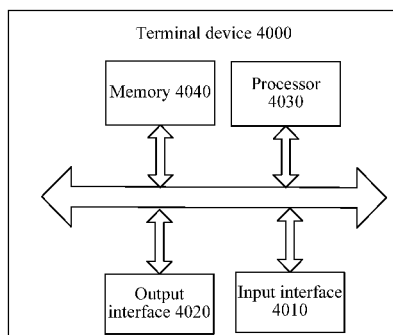
FIG. 10 is still another schematic block diagram of a terminal device according to an embodiment of this disclosure.

As shown in FIG. 10, an embodiment of this disclosure further provides a terminal device 4000, and the terminal device 4000 may be the terminal device 800 in FIG. 6, and can be configured to perform content of the terminal device corresponding to the method 200 in FIG. 2. The terminal device 4000 includes: an input interface 4010, an output interface 4020, a processor 4030 and a memory 4040, and the input interface 4010, the output interface 4020, the processor 4030 and the memory 4040 may be connected by using a bus system. The memory 4040 is configured to store a program, an instruction or a code. The processor 4030 is configured to execute the program, the instruction or the code in the memory 4040, so as to control the input interface 4010 to receive a signal, control the output interface 4020 to send a signal and complete operations in the foregoing method embodiment.

Therefore, the terminal device according to this embodiment of this disclosure sends a priority list of a parameter for establishing a PDU session to the SMF device, to facilitate increase in a probability that the PDU session is established successfully.

In a specific implementation, the sending unit in the terminal device 600 may be implemented by the output interface 4020 in FIG. 10, and the receiving unit in the terminal device 600 may be implemented by the input interface 4010 in FIG. 10.

Figure 11:
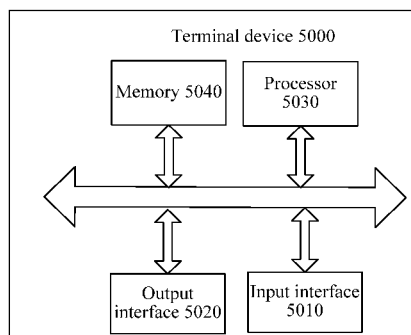
FIG. 11 is still another schematic block diagram of a terminal device according to an embodiment of this disclosure.

As shown in FIG. 11, an embodiment of this disclosure further provides a terminal device 5000, and the terminal device 5000 may be the terminal device 700 in FIG. 7, and can be configured to perform content of the terminal device corresponding to the method 300 in FIG. 3. The terminal device 5000 includes: an input interface 5010, an output interface 5020, a processor 5030 and a memory 5040, and the input interface 5010, the output interface 5020, the processor 5030 and the memory 5040 may be connected by using a bus system. The memory 5040 is configured to store a program, an instruction or a code. The processor 5030 is configured to execute the program, the instruction or the code in the memory 5040, so as to control the input interface 5010 to receive a signal, control the output interface 5020 to send a signal and complete operations in the foregoing method embodiment.

Therefore, the terminal device according to this embodiment of this disclosure receives a session establishment status fed back by the SMF device, so that the terminal device can adjust a session establishment policy in time, thereby facilitating improvement in performance of a communications system.

In a specific implementation, the sending unit in the terminal device 700 may be implemented by the output interface 5020 in FIG. 11, and the receiving unit in the terminal device 700 may be implemented by the input interface 5010 in FIG. 11.

Figure 12:
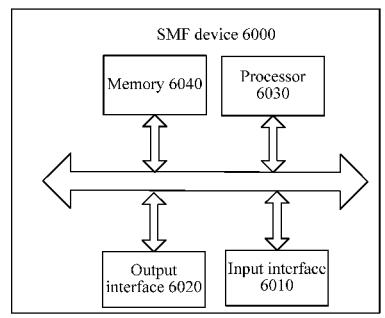
FIG. 12 is still another schematic block diagram of an SMF device according to an embodiment of this disclosure.

As shown in FIG. 12, an embodiment of this disclosure further provides an SMF device 6000, and the SMF device 6000 may be the SMF device 800 in FIG. 8, and can be configured to perform content of the SMF device corresponding to the method 400 in FIG. 4. The SMF device 6000 includes: an input interface 6010, an output interface 6020, a processor 6030 and a memory 6060, and the input interface 6010, the output interface 6020, the processor 6030 and the memory 6060 may be connected by using a bus system. The memory 6060 is configured to store a program, an instruction or a code. The processor 6030 is configured to execute the program, the instruction or the code in the memory 6060, so as to control the input interface 6010 to receive a signal, control the output interface 6020 to send a signal and complete operations in the foregoing method embodiment.

Therefore, the SMF device according to this embodiment of this disclosure establishes a PDU session according to a priority list that is of a parameter for establishing a PDU session and that is sent by the terminal device, to facilitate increase in a probability that the PDU session is established successfully.

In a specific implementation, the establishment unit in the SMF device 800 may be implemented by the processor 6030 in FIG. 12. The receiving unit in the SMF device 800 may be implemented by the input interface 6010 in FIG. 12. The sending unit in the SMF device 800 may be implemented by the output interface 6020 in FIG. 12.

Figure 13:
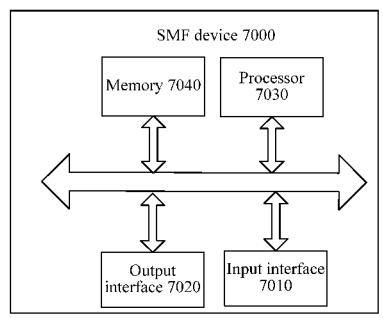
FIG. 13 is still another schematic block diagram of an SMF device according to an embodiment of this disclosure.

As shown in FIG. 13, an embodiment of this disclosure further provides an SMF device 7000, and the SMF device 7000 may be the SMF device 900 in FIG. 9, and can be configured to perform content of the SMF device corresponding to the method 500 in FIG. 5. The SMF device 7000 includes: an input interface 7010, an output interface 7020, a processor 7030 and a memory 7040, and the input interface 7010, the output interface 7020, the processor 7030 and the memory 7040 may be connected by using a bus system. The memory 7040 is configured to store a program, an instruction or a code. The processor 7030 is configured to execute the program, the instruction or the code in the memory 7040, so as to control the input interface 7010 to receive a signal, control the output interface 7020 to send a signal and complete operations in the foregoing method embodiment.

Therefore, the SMF device according to this embodiment of this disclosure feeds back a session establishment status to the terminal device, so that the terminal device can adjust a session establishment policy in time, thereby facilitating improvement in performance of a communications system.

In a specific implementation, the sending unit in the SMF device 900 may be implemented by the output interface 7020 in FIG. 13. The receiving unit in the SMF device 900 may be implemented by the input interface 7010 in FIG. 13.

Figure 14:
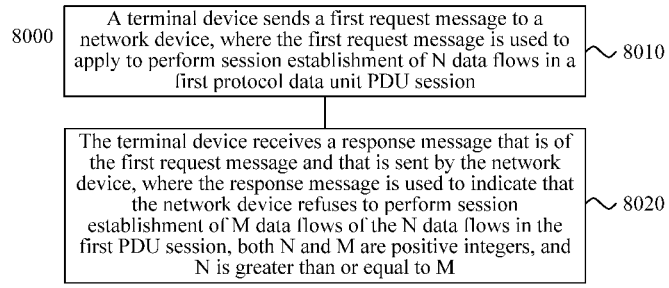
FIG. 14 is a schematic block diagram of a data transmission method according to an embodiment of this disclosure.

FIG. 14 is a schematic block diagram of a data transmission method 8000 according to an embodiment of this disclosure. A terminal device shown in FIG. 14 may be a terminal device shown in FIG. 1, and a network device shown in FIG. 14 may be a core network device shown in FIG. 1. The method 8000 includes some or all of the following content:

S8010. A terminal device sends a first request message to a network device, where the first request message is used to apply to perform session establishment of N data flows in a first protocol data unit PDU session.

S8020. The terminal device receives a response message that is of the first request message and that is sent by the network device, where the response message is used to indicate that the network device refuses to perform session establishment of M data flows of the N data flows in the first PDU session, both N and M are positive integers, and N is greater than or equal to M.

Specifically, when the terminal device applies to establish a session in a protocol data unit (PDU) session for a plurality of data flows, the terminal device may send a non-access stratum (NAS) message to the core network device, where the NAS message may request to establish or modify a PDU session, and the NAS message may carry an identifier (ID) of the PDU session. After receiving the NAS message, the core network device may learn a PDU session in which a session of a data flow is established. It should be understood that, one terminal device may have a plurality of PDU sessions, and this embodiment of this disclosure is specific to one of a plurality of PDU sessions of one terminal device. After the core network device receives the session establishment or modification request sent by the terminal device, the core network device may trigger an access network device to establish or modify a plurality of data flows in the PDU session. The access network device may then determine, according to the request, data flows for which session establishment may be performed in the PDU session, and data flows for which session establishment cannot be performed in the PDU session, and then the access network device may send a data flow list to the core network device, where the data flow list may be a data flow list accepted by the access network device, or may be a data flow list refused by the access network device. After receiving the data flow list, the core network device may send a response message to the terminal device, to notify the terminal device that the network device refuses some data flows of the requested data flows. After some data flows are refused, the terminal device may perform corresponding adjustment, for example, may adjust a parameter for establishing the PDU session, or re-initiate session establishment of the refused data flows in another PDU session.

Therefore, in the data transmission method according to this embodiment of this disclosure, a session establishment status is fed back to the terminal device, so that the terminal device can adjust a session establishment policy in time, thereby facilitating improvement in performance of a communications system.

It should be understood that, this embodiment of this disclosure may be applied to a 5G communications system. That is to say, the core network device in this embodiment of this disclosure may be an SMF in 5G. Optionally, during session establishment, the SMF may interact with a UPF to perform session establishment.

Optionally, the response message carries a refusal cause value, and the refusal cause value is used to indicate that the first PDU session does not support the M data flows.

Usually, the network side may refuse establishment of one or more flows in one PDU session due to a plurality of causes that may be, for example, being not allowed by the PDU session, being not allowed by radio access technology (RAT) access, an unsatisfactory session and service continuity mode, incorrect single-network slice selection assistance information (S-NSSAI), being not supported by a data network name (DNN), and an unidentifiable PDU session identifier. In this embodiment of this disclosure, the network side may add a cause value to the response message sent by the terminal device. Specifically, the network side may make an agreement with the terminal device in advance that several bits are used to represent the foregoing various causes. For example, 0001 may be used to represent being not allowed by the PDU session, and 0010 may be used to represent being not allowed by RAT access. Being not allowed by the PDU session may be that a PDU session is full, and a data flow and the like cannot be added to the PDU session, and being not allowed by the PDU session and an unidentifiable PDU session identifier may be both considered as being not supported by the PDU session. When the terminal device learns, according to the response message, that the cause is being not supported by the PDU session, the terminal device may properly adjust the PDU session, and re-initiate session establishment or modification to the network device. Therefore, a possibility that the PDU session is established successfully may be increased.

Optionally, the response message carries an identifier of each of the M data flows.

Further, the network device may further indicate, to the terminal device through the response message, data flows that are refused by the network side. For example, a data flow list accepted by the network device may be carried in the response message, and the terminal device may further determine, according to the accepted data flow list, data flows that are refused. Alternatively, the data flow list refused by the network device may be directly carried in the response message. The data flow list may include identifiers of a plurality of data flows.

After the terminal device learns data flows that are refused, the terminal device may perform targeted session adjusting on these refused data flows. The terminal device may alternatively not need to know data flows that are refused, and once a refusal cause is learned, the terminal device may perform session adjustment on all data flows.

Optionally, the method further includes: sending, by the terminal device in response to the response message, a second request message to the network device, where the second request message is used to apply to perform session establishment of at least one of the M data flows in a second PDU session.

Optionally, the first request message carries an identifier of the first PDU session, the second request message carries an identifier of the second PDU session, and the second PDU session is the first PDU session obtained after the identifier of the first PDU session is adjusted.

Optionally, before the terminal device responds to the response message, the method further includes: adjusting, by the terminal device, an establishment parameter of the second PDU session other than the first PDU session according to the M data flows.

It can be known from the above that, after the terminal device learns the refused data flow list, and learns that a refusal cause is being not supported by the PDU session, the terminal device may adjust session establishment of the data flows. For example, if the terminal device knows that the cause is because an identifier of a previous PDU session is not identified by a local network, the terminal device may generate a new identifier, and again perform session establishment on the refused data flows by using content of the previous PDU session. Specifically, if the local network identifies PDU session identifiers 1 to 100, and an identifier of the previous PDU session is 101, the local network cannot identify the PDU session identifier, and the network side may notify the terminal device that the PDU session identifier is not identified. Therefore, the terminal device may generate a new PDU session identifier between 1 and 100, re-initiate a session establishment or modification request by using the PDU session, and add the generated new PDU session identifier to the request. For another example, if the terminal device knows that a data flow is refused because of being not allowed by the previous PDU session, the terminal device may bind the refused data flow to another PDU session, and re-initiate PDU session establishment. Specifically, the terminal device may modify a parameter for establishing the another PDU session, and associate the refused data flow with the PDU session.

Optionally, the response message carries an identifier of the second PDU session.

Specifically, once the network device determines that some data flows are refused because of being not supported by the PDU session, the network device may send an allowed PDU session to the terminal device. For example, the network device may directly add an identifier of the allowed PDU session to the response message. Alternatively, once the network device determines that some data flows are refused because an identifier of a PDU session is not identified, the network device may send an identifier of an allowed PDU session to the terminal device. In short, the network device may send allowed values, of various parameters, corresponding to refusal cause values to the terminal device. This embodiment of this disclosure is not limited thereto.

A flowchart of a data transmission method 9000 according to an embodiment of this disclosure is described in detail below with reference to FIG. 15. The method is described by using a 5G communications system as an example, and the method 9000 includes some or all of the following content:

S9001. UE sends an establishment or modification request of a first PDU session to an SMF, where the NAS message carries an identifier of the first PDU session.

S9002. After receiving the establishment or modification request of the first PDU session, the SMF may interact with a UPF to perform session establishment.

S9003. After receiving the establishment or modification request of the first PDU session, the SMF may alternatively trigger a radio access network (RAN) to perform a session establishment or modification request.

S9004. After performing session establishment, the RAN may response to the SMF, and add an accepted or refused flow list.

S9005. After receiving the response of the RAN, the SMF may add, by responding to the UE, the refused list that may be completely refused or may be partially refused, or may add a refused cause, and may further add an allowed value, that is, an allowed PDU session or an identifier of an allowed PDU session.

S9006. After receiving a response message, the UE may perform corresponding adjustment, and re-initiate PDU session establishment or modification. Specifically, the UE may send a request for establishing or modifying a second PDU session to the SMF, where the request may carry a new PDU session identifier (the PDU session identifier is not identified), or may carry an identifier of the second PDU session (in place of the PDU session), and a previously refused flow.

Figure 16:
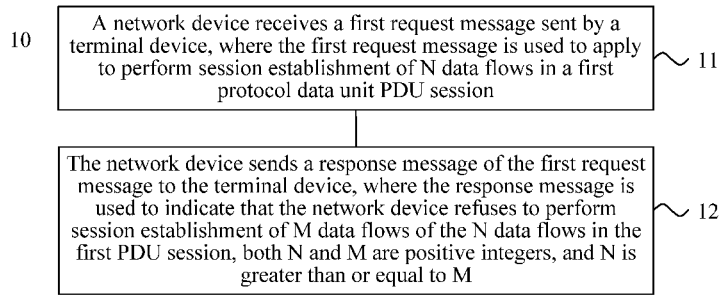
FIG. 16 is still another schematic block diagram of a data transmission method according to an embodiment of this disclosure.

FIG. 16 is a schematic block diagram of a data transmission method 10 according to an embodiment of this disclosure. As shown in FIG. 16, the method 10 includes some or all of the following content:

S11. A network device receives a first request message sent by a terminal device, where the first request message is used to apply to perform session establishment of N data flows in a first protocol data unit PDU session.

S12. The network device sends a response message of the first request message to the terminal device, where the response message is used to indicate that the network device refuses to perform session establishment of M data flows of the N data flows in the first PDU session, both N and M are positive integers, and N is greater than or equal to M.

Therefore, in the data transmission method according to this embodiment of this disclosure, a session establishment status is fed back to the terminal device, so that the terminal device can adjust a session establishment policy in time, thereby facilitating improvement in performance of a communications system.

Optionally, the response message carries a refusal cause value, and the refusal cause value is used to indicate that the first PDU session does not support the M data flows.

Optionally, the response message carries an identifier of each of the M data flows.

Optionally, the method further includes: receiving, by the network device, a second request message sent by the terminal device, where the second request message is used to apply to perform session establishment of at least one of the M data flows in a second PDU session.

Optionally, the response message carries an identifier of the second PDU session allowed by the network device other than the first PDU session.

Optionally, the network device is a session management function SMF device, and the method further includes: triggering, by the SMF device according to the first request message, an access network device to perform session establishment of the N data flows in the first PDU session; and receiving, by the SMF device, a data flow list that corresponds to the first PDU session and that is sent by the access network device, where the data flow list includes the M data flows or (N-M) data flows of the N data flows received by the first PDU session.

It should be understood that, interaction between the network device and the terminal device and related characteristics, functions and the like described for the network device correspond to related characteristics and functions of the terminal device. Moreover, related content has been described in detail in the foregoing method 8000 and method 9000. For brevity, details are not described herein again.

It should be further understood that, sequence numbers of the foregoing processes do not mean execution orders in various embodiments of this disclosure. The execution orders of the processes should be determined according to functions and internal logic of the processes, and should not be construed as any limitation on the implementation processes of the embodiments of this disclosure.

Figure 17:
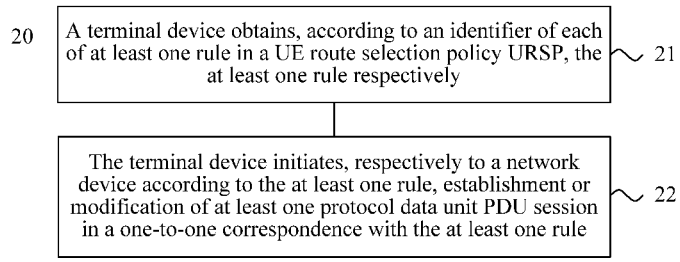
FIG. 17 is still another schematic block diagram of a data transmission method according to an embodiment of this disclosure.

FIG. 17 is a schematic block diagram of a data transmission method 20 according to an embodiment of this disclosure. As shown in FIG. 17, the method 20 includes some or all of the following content:

S21. A terminal device obtains, according to an identifier of each of at least one rule in a UE route selection policy URSP, the at least one rule respectively.

S22. The terminal device initiates, respectively to a network device according to the at least one rule, establishment or modification of at least one protocol data unit PDU session in a one-to-one correspondence with the at least one rule.

Specifically, in 5G, the concept of a UE route selection policy (URSP) is introduced, and the URSP policy specifies a routing policy of UE for different data flows. Each terminal device has only one URSP, each URSP may have a plurality of rules, and the terminal device may initiate establishment of one PDU session based on each rule. Specifically, the terminal device may initiate establishment or modification of one PDU session based on one or more parameters in one rule. For example, the one or more parameters may be an access RAT, session and service continuity, a network slice, or splitting. A parameter in the rule may be measured by a core network, and sent to the terminal device when the terminal device performs registration, and the terminal device initiates a session establishment or modification process accordingly. In this embodiment of this disclosure, a rule identifier may be introduced, so that the terminal device may obtain a rule according to the rule identifier, instead of delivering, by the network device, all rules to the terminal device at a time, thereby alleviating a pressure of the network device and improving communication flexibility.

Optionally, the at least one rule is a plurality of rules, and the initiating, by the terminal device respectively to a network device according to the plurality of rules, establishment or modification of a plurality of protocol data unit PDU sessions in a one-to-one correspondence with the plurality of rules includes: initiating, by the terminal device, establishment or modification of the plurality of PDU sessions to the network device sequentially according to priorities of the plurality of rules.

Specifically, in this embodiment of this disclosure, the priority concept may be introduced to the plurality of rules in the URSP. That is to say, the terminal device may preferentially initiate, based on a rule, PDU session establishment or modification corresponding to the rule to the network device. The terminal device may alternatively classify the plurality of rules, perform priority sorting on all types of rules. PDU sessions initiated in a same type of rules may not be sorted. That is to say, the PDU sessions may be initiated in any order.

Optionally, a priority of each rule may be represented by an identifier of each rule. For example, once the terminal device obtains a rule #1, the terminal device may consider that a priority of the rule #1 is highest.

Optionally, a first rule of the at least one rule includes at least one of the following parameters: a radio access technology RAT, a session and service continuity mode, single-network slice selection assistance information S-NSSAI, a splitting type, a data network name DNN, a PDU session type, and a data flow filter.

It should be understood that, description is made herein by using the first rule, each rule in the URSP may include any combination of the foregoing various parameters, and the foregoing various parameters are only schematically described. This embodiment of this disclosure is not limited thereto.

Optionally, a first parameter of the at least one parameter includes a plurality of values representing priorities, and the initiating, by the terminal device, establishment or modification of a first protocol data unit PDU session to a network device according to the first rule includes: initiating, by the terminal device, establishment or modification of the first PDU session to the network device according to the priorities of the plurality of values.

For example, the first rule may include an access RAT, a session and service continuity mode, and single-network slice selection assistance information S-NSSAI, and values of the access RAT is 3rd Generation Partnership Project (3GPP) access and wireless local area network (WLAN) access. The session and service continuity mode includes a mode 3 and a mode 2, and the S-NSSAI includes S-NSSAI-a and S-NSSAI-b. Priority sorting may be performed on values of parameters. For example, the access RAT may preferentially use the 3GPP access, the S-NSSAI may preferentially use the S-NSSAI-a, and the session and service continuity mode may preferentially use the mode 3. Once the network device feeds back that a value of a parameter is inappropriate, the terminal device may adjust the value to another value. At the first time of initiating PDU session establishment or modification, the terminal device may randomly select a value of a parameter in a rule corresponding to the PDU session. The terminal device may alternatively directly select a value having a relatively high priority of a parameter, to increase a possibility that the PDU session is established successfully. If the terminal device randomly selects a value of a parameter at the first time of initiating PDU session establishment or modification, when the network device refuses the PDU session request because the parameter does not satisfy a requirement, the terminal device may select a value having a higher priority of the parameter to re-initiate the PDU session request.

Optionally, the initiating, by the terminal device, establishment or modification of a first protocol data unit PDU session to a network device according to a first rule of the at least one rule includes: sending, by the terminal device, a first request message to the network device according to the first rule, where the first request message is used to request the network device to perform session establishment of N data flows in the first PDU session; and after the initiating, by the terminal device, establishment or modification of a first protocol data unit PDU session to the network device according to the first rule, the method further includes: receiving, by the terminal device, a response message that is of the first request message and that is sent by the network device, where the response message is used to indicate that the network device refuses to perform session establishment of M data flows of the N data flows in the first PDU session, both N and M are positive integers, and N is greater than or equal to M.

Optionally, the response message carries a refusal cause value, and the refusal cause value is used to indicate at least one of the following cases: being not supported by the PDU session, being not allowed by RAT access, an unsatisfactory session and service continuity mode, incorrect S-NSSAI, being not supported by a DNN, and an unidentifiable PDU session identifier.

Usually, the network side may refuse establishment of one or more flows in one PDU session due to a plurality of causes that may be, for example, that a parameter in a rule corresponding to the PDU session and being in the URSP does not satisfy a requirement such as being not allowed by the PDU session, being not allowed by RAT access, an unsatisfactory session and service continuity mode, incorrect S-NSSAI, being not supported by a DNN, or may be that an unidentifiable PDU session identifier. In this embodiment of this disclosure, the network side may add a cause value to the response message sent by the terminal device. Specifically, the network side may make an agreement with the terminal device in advance that several bits are used to represent the foregoing various causes. For example, 0001 may be used to represent being not allowed by the PDU session, and 0010 may be used to represent being not allowed by RAT access. Once the terminal device learns that a parameter in a corresponding rule in the URSP does not satisfy a requirement, the terminal device may adjust a value of the parameter.

Optionally, the method further includes: adjusting, by the terminal device in response to the response message, a value of a parameter that is in the first rule and that corresponds to the refusal cause value; and sending, by the terminal device, a second request message to the network device according to the adjusted first rule, where the second request message is used to request the network device to perform session establishment of at least one of the M data flows in the first PDU session.

Optionally, the parameter that is in the first rule and that corresponds to the refusal cause value includes a plurality of values representing priorities, and the adjusting, by the terminal device in response to the response message, a value of a parameter that is in the first rule and that corresponds to the refusal cause value includes: adjusting, by the terminal device in response to the response message, the value of the parameter that is in the first URSP and that corresponds to the refusal cause value into a value whose priority is higher than that for initiating establishment of the first PDU session previous time.

Optionally, the response message carries a value, allowed by the network device, of the parameter that is in the first rule and that corresponds to the refusal cause value, and the adjusting, by the terminal device in response to the response message, the value of the parameter that is in the first URSP and that corresponds to the refusal cause value includes: adjusting, by the terminal device, the value of the parameter that is in the first rule and that corresponds to the refusal cause value into the value, allowed by the network device, of the parameter that is in the first rule and that corresponds to the refusal cause value.

That is to say, after the terminal device receives the response message, if the network device adds an allowed value to the response message, modification is performed according to the allowed value; or if the network device adds no allowed value to the response message, a parameter in a rule corresponding to a refusal cause value may be adjusted according to a priority of the parameter. For example, if a response of the network device is that access of the access RAT is not satisfied, the terminal device may select RAT access having a higher priority to re-initiate PDU session establishment. If a response of the network device is that access of the access RAT is not satisfied, and the response carries a suggestion that RAT access is 3GPP access, the terminal device may directly re-initiate PDU session establishment according to the 3GPP access.

Optionally, the method further includes: receiving, the terminal device, an identifier of a second rule other than the first rule of the at least one rule in the URSP and an identifier of the first rule that are sent by the network device; and the obtaining, by the terminal device, the first rule according to the identifier of the first rule includes: obtaining, by the terminal device after establishing a second PDU session corresponding to the second rule, the first rule through a user plane according to the identifier of the first rule; or triggering, by the terminal device according to the identifier of the first rule, the network device to deliver the first rule through a control plane.

A person skilled in the art understands that, when the terminal device performs network registration, the network device delivers the URSP policy to the terminal device through a policy control function (PCF).

Optionally, the method further includes: receiving, by the terminal device, an identifier of a server; and the obtaining, by the terminal device after establishing a second PDU session corresponding to the second rule, the first rule through a user plane according to the identifier of the first rule includes: obtaining, by the terminal device after establishing the second PDU session corresponding to the second rule, the first rule through the user plane according to the identifier of the first rule and the identifier of the server.

Optionally, a priority of the second rule is higher than a priority of the first rule.

In this embodiment of this disclosure, to alleviate a network pressure, if the PCF possibly cannot completely deliver the URSP policy to the terminal device through one signaling message when the URSP policy is excessively large, the PCF may deliver the plurality of rules in the URSP to the terminal device in batches through the control plane. For example, the plurality of rules may be divided into groups, and each message is used to deliver one group of rules; or priority sorting may be performed on the plurality of rules to be actively delivered in batches, and a rule having a high priority may be first delivered. After receiving a batch of rules each time, the terminal device may further send an identifier of a required rule to the PCF. Specifically, if the PCF delivers a rule 1 and a rule 2 to the terminal device for the first time, the terminal device may feed back an identifier of a rule 3 and an identifier of a rule 4 to the PCF, so that the PCF resends the rule 3 and the rule 4 to the terminal device.

The PCF may alternatively first send some rules to the terminal device, and add identifiers of some other rules. After the terminal device establishes the user plane according to the some rules, the terminal device may obtain the some other rules on the user plane according to the identifiers of the some other rules. Further, the PCF may further deliver, to the terminal device, an identifier of a server storing the some other rules, and after establishing the user plane according to the some rules, the terminal device may obtain, according to the identifiers of the some other rules, the some other rules from the server corresponding to the user plane.

The URSP policy is obtained in batches, so that a network pressure may be effectively reduced, and communication flexibility may be effectively improved.

Optionally, the obtaining, by a terminal device according to an identifier of each of at least one rule in a UE route selection policy URSP, the at least one rule respectively includes: obtaining, by the terminal device, the at least one rule according to the identifier of each of the at least one rule when the terminal device performs network registration.

Figure 18:
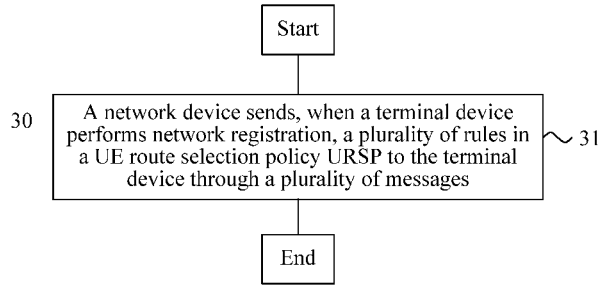
FIG. 18 is still another schematic block diagram of a data transmission method according to an embodiment of this disclosure.

FIG. 18 is a schematic block diagram of a data transmission method 30 according to an embodiment of this disclosure. As shown in FIG. 18, the method 30 includes some or all of the following content:

S31. A network device sends, when a terminal device performs network registration, a plurality of rules in a UE route selection policy URSP to the terminal device through a plurality of messages.

Therefore, in the data transmission method according to this embodiment of this disclosure, The URSP policy is obtained in batches, so that a network pressure may be effectively reduced, and communication flexibility may be effectively improved.

Optionally, the sending, by a network device when a terminal device performs network registration, a plurality of rules in a UE route selection policy URSP to the terminal device through a plurality of messages includes: sending, by the network device when the terminal device performs network registration, the plurality of rules to the terminal device sequentially through a plurality of messages of a control plane according to priorities of the plurality of rules.

Optionally, the network device is a policy control function PCF.

Figure 19:
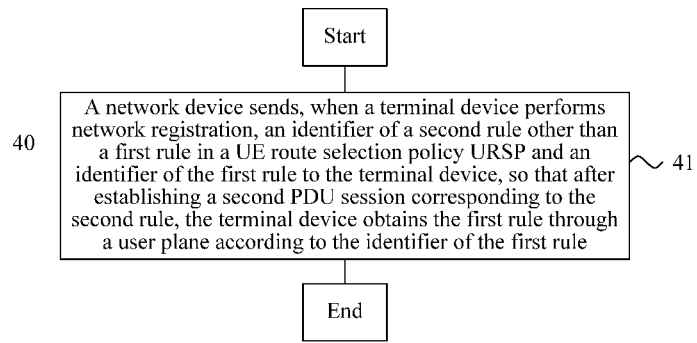
FIG. 19 is still another schematic block diagram of a data transmission method according to an embodiment of this disclosure.

FIG. 19 is a schematic block diagram of a data transmission method 40 according to an embodiment of this disclosure. As shown in FIG. 19, the method 40 includes some or all of the following content:

S41. A network device sends, when a terminal device performs network registration, an identifier of a second rule other than a first rule in a UE route selection policy URSP and an identifier of the first rule to the terminal device, so that after establishing a second PDU session corresponding to the second rule, the terminal device obtains the first rule through a user plane according to the identifier of the first rule.

In the data transmission method according to this embodiment of this disclosure, The URSP policy is obtained in batches, so that a network pressure may be effectively reduced, and communication flexibility may be effectively improved.

Optionally, the method further includes: sending, by the network device, an identifier of a server to the terminal device, so that after establishing the second PDU session corresponding to the second rule, the terminal device obtains the first rule through the user plane according to the identifier of the first rule and the identifier of the server.

Optionally, the network device is a policy control function PCF.

It should be understood that, interaction between the network device and the terminal device and related characteristics, functions and the like described for the network device correspond to related characteristics and functions of the terminal device. Moreover, related content has been described in detail in the foregoing method 600. For brevity, details are not described herein again.

It should be further understood that, sequence numbers of the foregoing processes do not mean execution orders in various embodiments of this disclosure. The execution orders of the processes should be determined according to functions and internal logic of the processes, and should not be construed as any limitation on the implementation processes of the embodiments of this disclosure.

Figure 20:
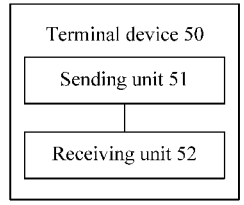
FIG. 20 is a schematic block diagram of a terminal device according to an embodiment of this disclosure.

The data transmission method according to the embodiments of this disclosure is described above in detail, a data transmission apparatus according to the embodiments of this disclosure is described below with reference to FIG. 20 to FIG. 29, and the technical characteristic described in the method embodiment is applicable to the following apparatus embodiment. FIG. 20 is a schematic block diagram of a terminal device 50 according to an embodiment of this disclosure. As shown in FIG. 20, the terminal device 50 includes:

a sending unit 51, configured to send a first request message to a network device, where the first request message is used to apply to perform session establishment of N data flows in a first protocol data unit PDU session; and a receiving unit 52, configured to receive a response message that is of the first request message and that is sent by the network device, where the response message is used to indicate that the network device refuses to perform session establishment of M data flows of the N data flows in the first PDU session, both N and M are positive integers, and N is greater than or equal to M.

Therefore, the terminal device according to this embodiment of this disclosure receives a session establishment status fed back by the network device, so that the terminal device can adjust a session establishment policy in time, thereby facilitating improvement in performance of a communications system.

Optionally, the response message carries a refusal cause value, and the refusal cause value is used to indicate that the first PDU session does not support the M data flows.

Optionally, the response message carries an identifier of each of the M data flows.

Optionally, the sending unit is further configured to send, in response to the response message, a second request message to the network device, where the second request message is used to apply to perform session establishment of at least one of the M data flows in a second PDU session.

Optionally, the first request message carries an identifier of the first PDU session, the second request message carries an identifier of the second PDU session, and the second PDU session is the first PDU session obtained after the identifier of the first PDU session is adjusted.

Optionally, before the terminal device responds to the response message, the terminal device further includes: a processing unit, configured to adjust an establishment parameter of the second PDU session other than the first PDU session according to the M data flows.

Optionally, the response message carries an identifier of the second PDU session.

Optionally, the network device is a session management function SMF device.

Figure 15:
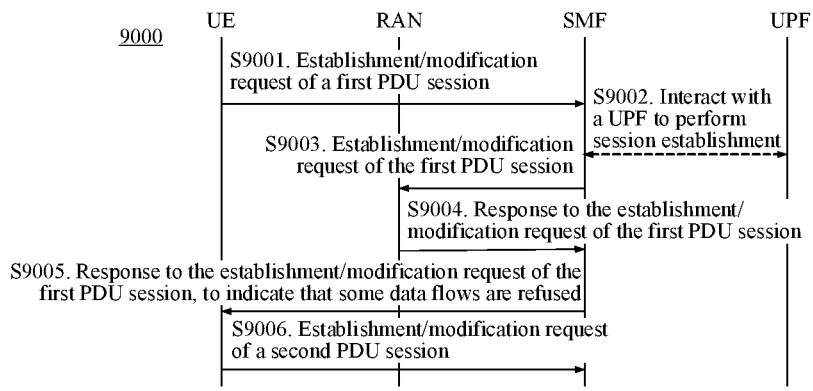
FIG. 15 is another schematic block diagram of a data transmission method according to an embodiment of this disclosure.

It should be understood that, the terminal device 50 according to this embodiment of this disclosure may correspond to the terminal device in the method embodiment of this disclosure, and the foregoing and other operations and/or functions of units in the terminal device 50 are respectively used to implement corresponding procedures of the terminal device in the method in FIG. 14 and FIG. 15. For brevity, details are not described herein again.

Figure 21:
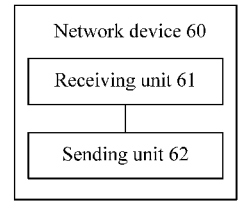
FIG. 21 is a schematic block diagram of a network device according to an embodiment of this disclosure.

FIG. 21 is a schematic block diagram of a network device 60 according to an embodiment of this disclosure. As shown in FIG. 21, the network device 60 includes:

a receiving unit 61, configured to receive a first request message sent by a terminal device, where the first request message is used to apply to perform session establishment of N data flows in a first protocol data unit PDU session; and a sending unit 62, configured to send a response message of the first request message to the terminal device, where the response message is used to indicate that the network device refuses to perform session establishment of M data flows of the N data flows in the first PDU session, both N and M are positive integers, and N is greater than or equal to M.

Therefore, the network device according to this embodiment of this disclosure feeds back a session establishment status to the terminal device, so that the terminal device can adjust a session establishment policy in time, thereby facilitating improvement in performance of a communications system.

Optionally, the response message carries a refusal cause value, and the refusal cause value is used to indicate that the first PDU session does not support the M data flows.

Optionally, the response message carries an identifier of each of the M data flows.

Optionally, the receiving unit is further configured to receive a second request message sent by the terminal device, where the second request message is used to apply to perform session establishment of at least one of the M data flows in a second PDU session.

Optionally, the response message carries an identifier of the second PDU session allowed by the network device other than the first PDU session.

Optionally, the network device is a session management function SMF device, and the network device further includes: a processing unit, configured to trigger, according to the first request message, an access network device to perform session establishment of the N data flows in the first PDU session; and the receiving unit is further configured to receive a data flow list that corresponds to the first PDU session and that is sent by the access network device, where the data flow list includes the M data flows or (N-M) data flows of the N data flows received by the first PDU session.

It should be understood that, the network device 60 according to this embodiment of this disclosure may correspond to the network device in the method embodiment of this disclosure, and the foregoing and other operations and/or functions of units in the network device 60 are respectively used to implement corresponding procedures of the network device in the method in FIG. 16. For brevity, details are not described herein again.

Figure 22:
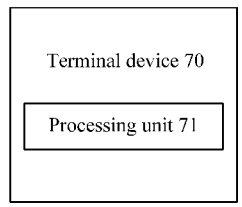
FIG. 22 is another schematic block diagram of a terminal device according to an embodiment of this disclosure.

FIG. 22 is a schematic block diagram of a terminal device 70 according to an embodiment of this disclosure. As shown in FIG. 22, the terminal device 70 includes:

a processing unit 71, configured to obtain, according to an identifier of each of at least one rule in a UE route selection policy URSP, the at least one rule respectively.

The processing unit 71 is further configured to initiate, respectively to a network device according to the at least one rule, establishment or modification of at least one protocol data unit PDU session in a one-to-one correspondence with the at least one rule.

The terminal device according to this embodiment of this disclosure may obtain a rule according to the rule identifier, instead of delivering, by the network device, all rules to the terminal device at a time, thereby alleviating a pressure of the network device and improving communication flexibility.

Optionally, the at least one rule is a plurality of rules, and the processing unit is specifically configured to: initiate establishment or modification of the plurality of PDU sessions to the network device sequentially according to priorities of the plurality of rules.

Optionally, a first rule of the at least one rule includes at least one of the following parameters: a radio access technology RAT, a session and service continuity mode, single-network slice selection assistance information S-NSSAI, a splitting type, a data network name DNN, a PDU session type, and a data flow filter.

Optionally, a first parameter of the at least one parameter includes a plurality of values representing priorities, and the processing unit is specifically configured to: initiate establishment or modification of the first PDU session to the network device according to the priorities of the plurality of values.

Optionally, the processing unit is further configured to send a first request message to the network device according to the first rule, where the first request message is used to request the network device to perform session establishment of N data flows in the first PDU session; and after the processing unit initiates establishment or modification of the first protocol data unit PDU session to the network device according to the first rule, the terminal device further includes: a receiving unit, configured to receive a response message that is of the first request message and that is sent by the network device, where the response message is used to indicate that the network device refuses to perform session establishment of M data flows of the N data flows in the first PDU session, both N and M are positive integers, and N is greater than or equal to M.

Optionally, the response message carries a refusal cause value, and the refusal cause value is used to indicate at least one of the following cases: being not supported by the PDU session, being not allowed by RAT access, an unsatisfactory session and service continuity mode, incorrect S-NSSAI, being not supported by a DNN, and an unidentifiable PDU session identifier.

Optionally, the terminal device further includes: the processing unit is further configured to adjust, in response to the response message, a value of a parameter that is in the first rule and that corresponds to the refusal cause value; and a sending unit, configured to send a second request message to the network device according to the adjusted first rule, where the second request message is used to request the network device to perform session establishment of at least one of the M data flows in the first PDU session.

Optionally, the parameter that is in the first rule and that corresponds to the refusal cause value includes a plurality of values representing priorities, and the processing unit is further configured to adjust, in response to the response message, the value of the parameter that is in the first URSP and that corresponds to the refusal cause value into a value whose priority is higher than that for initiating establishment of the first PDU session previous time.

Optionally, the response message carries a value, allowed by the network device, of the parameter that is in the first rule and that corresponds to the refusal cause value, and the adjusting, by the processing unit in response to the response message, the value of the parameter that is in the first URSP and that corresponds to the refusal cause value includes: adjusting, by the processing unit, the value of the parameter that is in the first rule and that corresponds to the refusal cause value into the value, allowed by the network device, of the parameter that is in the first rule and that corresponds to the refusal cause value.

Optionally, the terminal device further includes: a receiving unit, configured to receive an identifier of a second rule other than the first rule of the at least one rule in the URSP and an identifier of the first rule that are sent by the network device; and the obtaining, by the processing unit, the first rule according to the identifier of the first rule includes:

obtaining, by the processing unit after establishing a second PDU session corresponding to the second rule, the first rule through a user plane according to the identifier of the first rule; or triggering, by the processing unit according to the identifier of the first rule, the network device to deliver the first rule through a control plane.

Optionally, the receiving unit is further configured to receive an identifier of a server; the obtaining, by the processing unit after establishing a second PDU session corresponding to the second rule, the first rule through a user plane according to the identifier of the first rule includes: obtaining, by the processing unit after establishing the second PDU session corresponding to the second rule, the first rule through the user plane according to the identifier of the first rule and the identifier of the server.

Optionally, a priority of the second rule is higher than a priority of the first rule.

Optionally, the obtaining, by a processing unit according to an identifier of each of at least one rule in a UE route selection policy URSP, the at least one rule respectively includes: obtaining, by the processing unit, the at least one rule according to the identifier of each of the at least one rule when the terminal device performs network registration.

It should be understood that, the terminal device 70 according to this embodiment of this disclosure may correspond to the terminal device in the method embodiment of this disclosure, and the foregoing and other operations and/or functions of units in the terminal device 70 are respectively used to implement corresponding procedures of the terminal device in the method in FIG. 17. For brevity, details are not described herein again.

Figure 23:
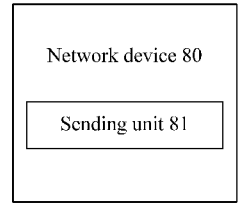
FIG. 23 is another schematic block diagram of a network device according to an embodiment of this disclosure.

FIG. 23 is a schematic block diagram of a network device 80 according to an embodiment of this disclosure. As shown in FIG. 23, the network device 80 includes:

a sending unit 81, configured to send, when a terminal device performs network registration, a plurality of rules in a UE route selection policy URSP to the terminal device through a plurality of messages.

Therefore, the network device according to this embodiment of this disclosure obtains URSP policies in batches, so that a network pressure may be effectively reduced, and communication flexibility may be effectively improved.

Optionally, when the terminal device performs network registration, the processing unit is specifically configured to: send, when the terminal device performs network registration, the plurality of rules to the terminal device sequentially through a plurality of messages of a control plane according to priorities of the plurality of rules.

Optionally, the network device is a policy control function PCF.

It should be understood that, the network device 80 according to this embodiment of this disclosure may correspond to the terminal device in the method embodiment of this disclosure, and the foregoing and other operations and/or functions of units in the network device 80 are respectively used to implement corresponding procedures of the terminal device in the method in FIG. 18. For brevity, details are not described herein again.

Figure 24:
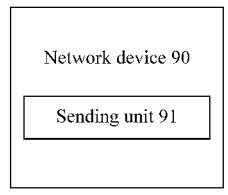
FIG. 24 is still another schematic block diagram of a network device according to an embodiment of this disclosure.

FIG. 24 is a schematic block diagram of a network device 90 according to an embodiment of this disclosure. As shown in FIG. 24, the network device 90 includes:

a sending unit 91, configured to send, when a terminal device performs network registration, an identifier of a second rule other than a first rule in a UE route selection policy URSP and an identifier of the first rule to the terminal device, so that after establishing a second PDU session corresponding to the second rule, the terminal device obtains the first rule through a user plane according to the identifier of the first rule.

Therefore, the network device according to this embodiment of this disclosure obtains URSP policies in batches, so that a network pressure may be effectively reduced, and communication flexibility may be effectively improved.

Optionally, the sending unit is further configured to send an identifier of a server to the terminal device, so that after establishing the second PDU session corresponding to the second rule, the terminal device obtains the first rule through the user plane according to the identifier of the first rule and the identifier of the server.

Optionally, the network device is a policy control function PCF.

It should be understood that, the network device 90 according to this embodiment of this disclosure may correspond to the terminal device in the method embodiment of this disclosure, and the foregoing and other operations and/or functions of units in the network device 90 are respectively used to implement corresponding procedures of the terminal device in the method in FIG. 19. For brevity, details are not described herein again.

Figure 25:
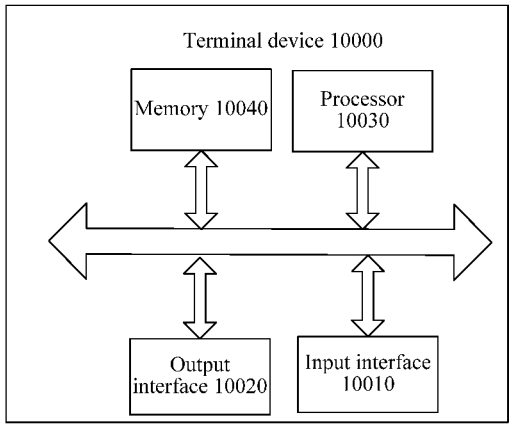
FIG. 25 is still another schematic block diagram of a terminal device according to an embodiment of this disclosure.

As shown in FIG. 25, an embodiment of this disclosure further provides a terminal device 10000, and the terminal device 10000 may be the terminal device 50 in FIG. 20, and can be configured to perform content of the terminal device corresponding to the method 8000 in FIG. 14. The terminal device 10000 includes: an input interface 10010, an output interface 10020, a processor 10030 and a memory 10040, and the input interface 10010, the output interface 10020, the processor 10030 and the memory 10040 may be connected by using a bus system. The memory 10040 is configured to store a program, an instruction or a code. The processor 10030 is configured to execute the program, the instruction or the code in the memory 10040, so as to control the input interface 10010 to receive a signal, control the output interface 10020 to send a signal and complete operations in the foregoing method embodiment.

Therefore, the terminal device according to this embodiment of this disclosure receives a session establishment status fed back by the network device, so that the terminal device can adjust a session establishment policy in time, thereby facilitating improvement in performance of a communications system.

In a specific implementation, the sending unit in the terminal device 50 may be implemented by the output interface 10020 in FIG. 25, and the receiving unit in the terminal device 50 may be implemented by the input interface 10010 in FIG. 25.

Figure 26:
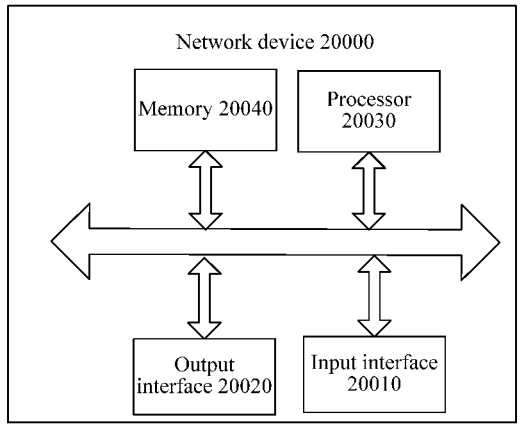
FIG. 26 is still another schematic block diagram of a network device according to an embodiment of this disclosure.

As shown in FIG. 26, an embodiment of this disclosure further provides a network device 20000, and the network device 20000 may be the network device 60 in FIG. 21, and can be configured to perform content of the network device corresponding to the method 9000 in FIG. 120. The network device 20000 includes: an input interface 20010, an output interface 20020, a processor 20030 and a memory 20040, and the input interface 20010, the output interface 20020, the processor 20030 and the memory 20040 may be connected by using a bus system. The memory 20040 is configured to store a program, an instruction or a code. The processor 20030 is configured to execute the program, the instruction or the code in the memory 20040, so as to control the input interface 20010 to receive a signal, control the output interface 20020 to send a signal and complete operations in the foregoing method embodiment.

Therefore, the network device according to this embodiment of this disclosure feeds back a session establishment status to the terminal device, so that the terminal device can adjust a session establishment policy in time, thereby facilitating improvement in performance of a communications system.

In a specific implementation, the sending unit in the network device 60 may be implemented by the output interface 20020 in FIG. 26, and the receiving unit in the network device 60 may be implemented by the input interface 20010 in FIG. 26.

Figure 27:
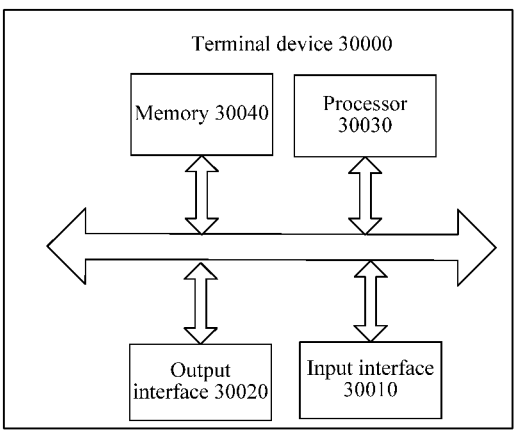
FIG. 27 is still another schematic block diagram of a terminal device according to an embodiment of this disclosure.

As shown in FIG. 27, an embodiment of this disclosure further provides a terminal device 30000, and the terminal device 30000 may be the terminal device 70 in FIG. 22, and can be configured to perform content of the terminal device corresponding to the method 10 in FIG. 17. The terminal device 30000 includes: an input interface 30010, an output interface 30020, a processor 30030 and a memory 300300, and the input interface 30010, the output interface 30020, the processor 30030 and the memory 300300 may be connected by using a bus system. The memory 300300 is configured to store a program, an instruction or a code. The processor 30030 is configured to execute the program, the instruction or the code in the memory 300300, so as to control the input interface 30010 to receive a signal, control the output interface 30020 to send a signal and complete operations in the foregoing method embodiment.

Therefore, the terminal device according to this embodiment of this disclosure may obtain a rule according to the rule identifier, instead of delivering, by the network device, all rules to the terminal device at a time, thereby alleviating a pressure of the network device and improving communication flexibility.

In a specific implementation, the processing unit in the terminal device 70 may be implemented by the processor 30030 in FIG. 27.

Figure 28:
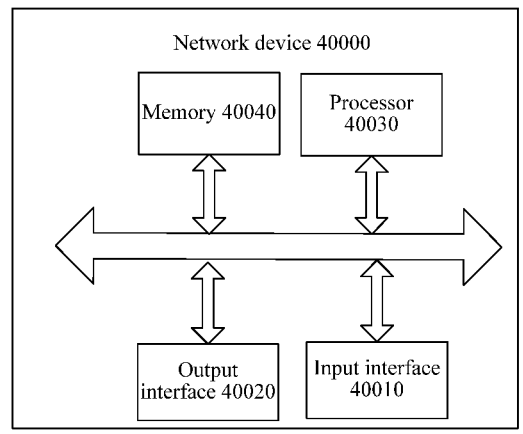
FIG. 28 is still another schematic block diagram of a network device according to an embodiment of this disclosure.

As shown in FIG. 28, an embodiment of this disclosure further provides a network device 40000, and the network device 40000 may be the network device 80 in FIG. 23, and can be configured to perform content of the network device corresponding to the method 20 in FIG. 18. The network device 40000 includes: an input interface 40010, an output interface 40020, a processor 40030 and a memory 40040, and the input interface 40010, the output interface 40020, the processor 40030 and the memory 40040 may be connected by using a bus system. The memory 40040 is configured to store a program, an instruction or a code. The processor 40030 is configured to execute the program, the instruction or the code in the memory 40040, so as to control the input interface 40010 to receive a signal, control the output interface 40020 to send a signal and complete operations in the foregoing method embodiment.

Therefore, the network device according to this embodiment of this disclosure obtains URSP policies in batches, so that a network pressure may be effectively reduced, and communication flexibility may be effectively improved.

In a specific implementation, the sending unit in the network device 2000 may be implemented by the output interface 40020 in FIG. 16.

Figure 29:
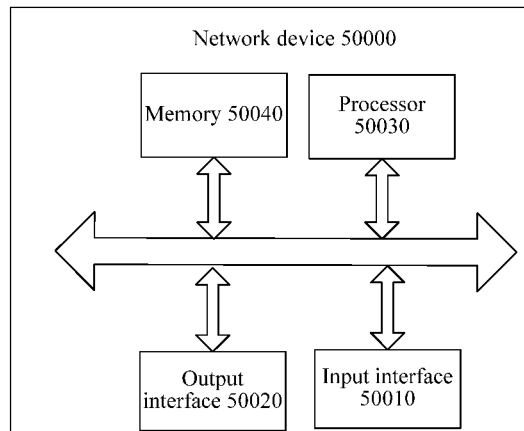
FIG. 29 is still another schematic block diagram of a network device according to an embodiment of this disclosure.

As shown in FIG. 29, an embodiment of this disclosure further provides a network device 50000, and the network device 50000 may be the network device 90 in FIG. 24, and can be configured to perform content of the network device corresponding to the method 30 in FIG. 19. The network device 50000 includes: an input interface 50010, an output interface 50020, a processor 50030 and a memory 50040, and the input interface 50010, the output interface 50020, the processor 50030 and the memory 50040 may be connected by using a bus system. The memory 50040 is configured to store a program, an instruction or a code. The processor 50030 is configured to execute the program, the instruction or the code in the memory 50040, so as to control the input interface 50010 to receive a signal, control the output interface 50020 to send a signal and complete operations in the foregoing method embodiment.

Therefore, the network device according to this embodiment of this disclosure obtains URSP policies in batches, so that a network pressure may be effectively reduced, and communication flexibility may be effectively improved.

In a specific implementation, the sending unit in the network device 90 may be implemented by the output interface 50020 in FIG. 29.

An embodiment of this disclosure further provides a chip, the chip may correspond to the terminal device in the embodiments of this disclosure, and the chip may implement a corresponding process, implemented by the terminal device, in each method of the embodiments of this disclosure. The chip includes a processor, and the processor may invoke and run a computer program from a memory, so as to implement a method in the embodiments of this disclosure.

Optionally, the chip may further include a memory. The processor may invoke and run a computer program from the memory, so as to implement a method in the embodiments of this disclosure.

The memory may be an individual device independent of the processor, or may be integrated in the processor.

Optionally, the chip may further include an input interface. The processor may control the input interface to communicate with another device or chip, and may specifically obtain information or data sent by the another device or chip.

Optionally, the chip may further include an output interface. The processor may control the output interface to communicate with another device or chip, and may specifically output information or data to the another device or chip.

An embodiment of this disclosure further provides another chip, the chip may correspond to the SMF device in the embodiments of this disclosure, and the chip may implement a corresponding process, implemented by the SMF device, in each method of the embodiments of this disclosure. The chip includes a processor, and the processor may invoke and run a computer program from a memory, so as to implement a method in the embodiments of this disclosure.

Optionally, the chip may further include a memory. The processor may invoke and run a computer program from the memory, so as to implement a method in the embodiments of this disclosure.

The memory may be an individual device independent of the processor, or may be integrated in the processor.

Optionally, the chip may further include an input interface. The processor may control the input interface to communicate with another device or chip, and may specifically obtain information or data sent by the another device or chip.

Optionally, the chip may further include an output interface. The processor may control the output interface to communicate with another device or chip, and may specifically output information or data to the another device or chip.

It should be understood that, the processor of this embodiment of this disclosure may be an integrated circuit chip, and has a signal processing capability. During implementation, the steps of the foregoing method embodiment may be implemented by using a hardware integrated logic circuit in the processor or implemented by using an instruction in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps and logical block diagrams disclosed in the embodiments of this disclosure. The general purpose processor may be a microprocessor or the processor may be any conventional processor and the like. Steps of the methods disclosed with reference to the embodiments of this disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It can be understood that, the memory in the embodiments of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory for the system and the method described herein aims to include but not limited to these memories and any other suitable types of memories.

It should be further understood that, the foregoing memory is described as an example other than a limitation. For example, the memory in this embodiment of this disclosure may be further a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct rambus random access memory (DR RAM), or the like. That is to say, the memory in this embodiment of this disclosure aims to include but not limited to these memories and any other suitable types of memories.

Optionally, an embodiment of this disclosure further provides a communications system. Specifically, the communications system may include the terminal device 600 and the SMF device 800 that are described above.

The terminal device 600 may be configured to implement a corresponding function, implemented by the terminal device, in the foregoing method 200, and the SMF device 800 may be configured to implement a corresponding function, implemented by the SMF device, in the foregoing method 400. For brevity, details are not described herein again.

Optionally, an embodiment of this disclosure further provides another communications system. Specifically, the communications system may include the terminal device 700 and the SMF device 900 that are described above.

The terminal device 700 may be configured to implement a corresponding function, implemented by the terminal device, in the foregoing method 300, and the SMF device 900 may be configured to implement a corresponding function, implemented by the SMF device, in the foregoing method 500. For brevity, details are not described herein again.

An embodiment of this disclosure further provides a computer readable storage medium, configured to store a computer program.

Optionally, the computer readable storage medium may be applied to the SMF device in the embodiments of this disclosure, and the computer program enables a computer to perform a corresponding process, implemented by the SMF device, in each method of the embodiments of this disclosure. For brevity, details are not described herein again.

Optionally, the computer readable storage medium may be applied to the terminal device in the embodiments of this disclosure, and the computer program enables a computer to perform a corresponding process, implemented by the terminal device, in each method of the embodiments of this disclosure. For brevity, details are not described herein again.

An embodiment of this disclosure further provides a computer program product, including a computer program instruction.

Optionally, the computer program product may be applied to the SMF device in the embodiments of this disclosure, and the computer program instruction enables a computer to perform a corresponding process, implemented by the SMF device, in each method of the embodiments of this disclosure. For brevity, details are not described herein again.

Optionally, the computer program product may be applied to the terminal device in the embodiments of this disclosure, and the computer program instruction enables a computer to perform a corresponding process, implemented by the terminal device, in each method of the embodiments of this disclosure. For brevity, details are not described herein again.

An embodiment of this disclosure further provides a computer program.

Optionally, the computer program may be applied to the SMF device in the embodiments of this disclosure, and when the computer program is run on a computer, the computer is enabled to perform a corresponding process, implemented by the SMF device, in each method of the embodiments of this disclosure. For brevity, details are not described herein again.

Optionally, the computer program may be applied to the terminal device in the embodiments of this disclosure, and when the computer program is run on a computer, the computer is enabled to perform a corresponding process, implemented by the terminal device, in each method of the embodiments of this disclosure. For brevity, details are not described herein again.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this disclosure essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or a part of the steps of the embodiments of this disclosure. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementation manners of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A data transmission method, comprising:
   storing, by the terminal, a parameter value list;
   sending, by a terminal device, an first protocol data unit (PDU) session establishment request message to a session management function (SMF), wherein the first PDU session establishment request message comprises at least one value in at least one of the parameter value list;
   receiving, by the terminal device, a response message sent by the SMF, wherein the response message carries a rejection cause value to indicate the cause why a first PDU session is established unsuccessfully; and
   sending, by the terminal device, in response to the response message, a second PDU session establishment request message to the SMF, comprising:
      when the rejection cause value indicates that a value of a parameter is not supported by the SMF, adjusting, by the terminal device, the value of the parameter, and sending, by the terminal device in response to the response message, a second PDU session establishment request message comprising an adjusted value of the parameter to the SMF; or
      when the rejection cause value indicates that a first value of the parameter is not supported, selecting, by the terminal device, a second value of the parameter according to the parameter value list, and sending, by the terminal device in response to the response message, the second PDU establishment request message comprising the second value of the parameter to the SMF;
   wherein the second PDU session establishment request message comprises other parameter, except the value of the parameter indicated in the rejection cause, in the first PDU session establishment request message, and a value of the other parameter is not changed.

2. The method according to claim 1, wherein the parameter value list comprises at least one of following parameter lists:
   a value list of session and service continuity (SSC) mode,
   a value list of single-network slice selection assistance information (S-NSSAI), or
   a value list of data network name (DNN).

3. The method according to claim 1, wherein the parameter value list is stored in a rule of UE Route Selection Policy (URSP).

4. The method according to claim 1, wherein the response message comprises a parameter allowed by the SMF.

5. The method according to claim 1, wherein the method further comprises:
   when the rejection cause value indicates that the second value of the parameter is not supported, selecting, by the terminal device, a third value of the parameter according to the parameter value list; and
   sending, by the terminal device in response to the response message, a third establishment request message, with the third value of the parameter to the SMF.

6. The method according to claim 1, wherein the rejection cause value indicates that the value of at least one of following parameters is not supported:
   PDU session identifier, a session and service continuity (SSC), a data network name (DNN), or single-network slice selection assistance information (S-NSSAI).

7. The method according to claim 6, wherein
   when there exists a plurality of S-NSSAI, the plurality of S-NSSAI have priorities;
   when there exists a plurality of DNNs, the plurality of DNNs have priorities.

8. The method according to claim 1, the method further comprises:
   sending, by the terminal device, the parameter value list to the SMF.

9. The method according to claim 8, wherein the rejection cause value is used to indicate that none of value of the parameter in the parameter value list is supported.

10. A terminal device, comprising:
    a memory configured for storing a parameter value list;
    an output interface configured for sending an first protocol data unit (PDU) session establishment request message to a session management function (SMF), wherein the first PDU session establishment request message comprises at least one value in at least one of the parameter value list; and
    an input interface configured for receiving a response message sent by the SMF, wherein the response message carries a rejection cause value to indicate the cause why a first PDU session is established unsuccessfully;
    wherein the output interface is further configured to:
    in response to the response message, send a second PDU session establishment request message to the SMF;
    wherein the terminal device further comprises a processor configured to:
       when the rejection cause value indicates that a value of a parameter is not supported by the SMF, adjust the value of the parameter; and control the output interface to send, in response to the response message, the second PDU session establishment request message comprising an adjusted value of the parameter to the SMF; or when the rejection cause value indicates that a first value of a parameter is not supported by the SMF, select a second value of the parameter according to the parameter value list; and control the output interface to send, in response to the response message, the second establishment request message comprising the second value of the parameter to the SMF;

wherein the second PDU session establishment request message comprises other parameter, except the parameter indicated in the rejection cause, in the first PDU session establishment request message, and a value of the other parameter is not changed.

11. The terminal device according to claim 10, wherein the parameter value list comprises at least one of following parameter lists:
   a value list of session and service continuity (SSC) mode,
   a value list of single-network slice selection assistance information (S-NSSAI), or
   a value list of data network name (DNN).

12. The terminal device according to claim 10, wherein the parameter value list is stored in a rule of UE Route Selection Policy (URSP).

13. The terminal device according to claim 10, wherein the response message comprises a parameter allowed by the SMF.

14. The terminal device according to claim 10, wherein the processor is further configured for when the rejection cause value indicates that the second value of the parameter is not supported, selecting a third value of the parameter according to the parameter value list; and
   the output interface is further configured for sending, in response to the response message, a third establishment request message, with the third value of the parameter to the SMF.

15. The terminal device according to claim 10, wherein the rejection cause value indicates that the value of at least one of following parameters is not supported:
   PDU session identifier, a session and service continuity (SSC), a data network name (DNN), or single-network slice selection assistance information (S-NSSAI).

16. The terminal device according to claim 15, wherein
   when there exists a plurality of S-NSSAI, the plurality of S-NSSAI have priorities;
   when there exists a plurality of DNNs, the plurality of DNNs have priorities.

17. The terminal device according to claim 10, wherein the output interface is further configured for:
   sending the parameter value list to the SMF.

18. The terminal device according to claim 17, wherein the rejection cause value is used to indicate that none of value of the parameter in the parameter value list is supported.

* * * * *